United States Patent [19]

Taniyoshi

[11] Patent Number: 5,196,050
[45] Date of Patent: Mar. 23, 1993

[54] CONTROL METHOD OF AND APPARATUS FOR MATERIAL CHARGING AT A TOP OF A BLAST FURNACE

[75] Inventor: Shuichi Taniyoshi, Kurashiki, Japan

[73] Assignee: Kawasaki Steel Corporation, Hyogo, Japan

[21] Appl. No.: 798,534

[22] Filed: Nov. 26, 1991

[30] Foreign Application Priority Data

Nov. 30, 1990 [JP] Japan .................................. 2-339852
Feb. 28, 1991 [JP] Japan .................................. 3-57794
Jul. 30, 1991 [JP] Japan .................................. 3-212816

[51] Int. Cl.$^5$ ............................................. C21B 7/24
[52] U.S. Cl. ......................................... 75/386; 75/387; 75/469; 266/91; 266/199
[58] Field of Search .................... 75/387, 386, 469; 266/91, 199

[56] References Cited

U.S. PATENT DOCUMENTS 4,913,406 4/1990 Fukushima et al. .................... 75/469
4,986,516 1/1991 Lonardi ................................ 266/199

Primary Examiner—Melvyn J. Andrews
Attorney, Agent, or Firm—Oliff & Berridge

[57] ABSTRACT

In a control method of material dumping at top of a blast furnace, in which material stored in a furnace top bunker is dumped through a flow rate control gate into a blast furnace in a specified time, value of initial material weight before the transfer start, divided by the specified time is set to first target dumping speed, and opening of the flow rate control gate is feedback controlled based on the measured material weight during dumping, so that the actual dumping speed after the dumping start is coincident with the first target dumping speed, and further, if necessary, remaining material weight in the furnace top bunker on the way of dumping is actually measured and value of the remaining material weight divided by the remaining time is set to second target dumping speed, and opening of the flow rate control gate is feedback controlled, based on the measured material weight during dumping, so that the second dumping speed after the measurement of the remaining material weight is coincident with the second target dumping speed, thereby even when physical properties of the material are varied, the material can be dumped at a prescribed dumping speed with good accuracy.

15 Claims, 21 Drawing Sheets

F I G. 10
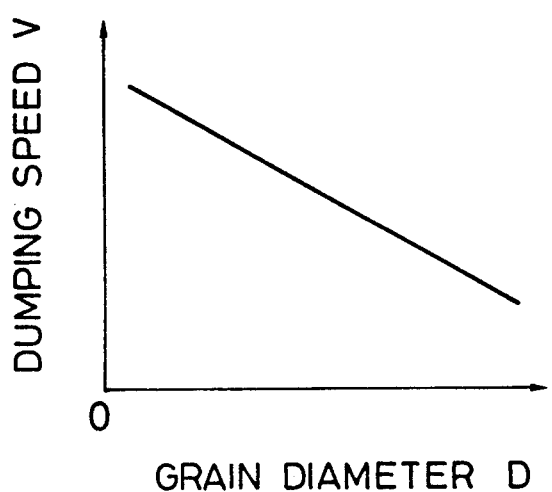
F I G. 11
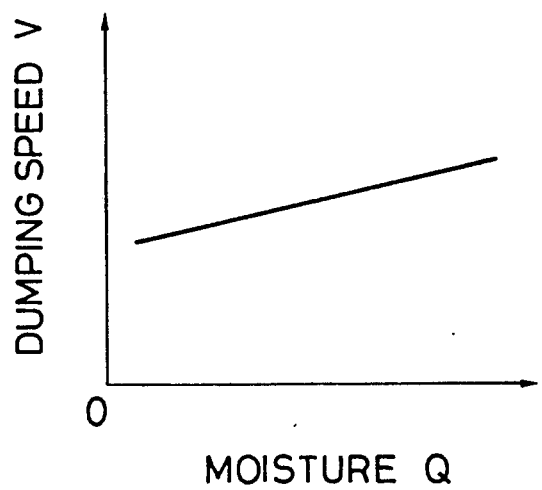

CONTROL METHOD OF AND APPARATUS FOR MATERIAL CHARGING AT A TOP OF A BLAST FURNACE

BACKGROUND OF THE INVENTION

1. Field of the Invention

The present invention relates to a control method of and apparatus for material charging at the top of a blast furnace where material can be charged precisely at target speed when material is charged into the furnace from a top bunker of belless furnace top charging equipment.

2. Description of the Prior Art

In the operation of blast furnace, blast furnace charging materials are stored in a bunker according to the kinds of materials the will be charged into the blast furnace. Firstly furnace charging materials of given kinds and given quantities are sent to a weighing hopper depending on the composition of the product to be made and charging schedules, and then material charging is carried out according to a given charging schedule and charging speed at the top of the furnace ultimately.

Generally speaking, a blast furnace operation shall be carried out efficiently using the inherent heat and reducing capabilities which gas possesses, while gas distribution and gas permeability within the blast furnace, depending on the properties of material to be charged into the blast furnace and material charge conditions to a great extent, are maintained under the proper condition.

Therefore, belless blast furnace top charging equipment is adopted as furnace top charging equipment of a blast furnace which can improve control labity of material distribution within the furnace and can increase the degree of freedom of the material distribution.

FIG. 21 is an explanation diagram of material charging method in a belless type blast furnace.

In FIG. 21, material M having been stored in advance in a furnace top bunker 10 is charged into a blast furnace 14, being controlled at a given charging speed by a flow rate control gate 12 provided at the lower end of the furnace top bunker 10.

Moreover, at the time of charging the material M into the blast furnace 14, concentric dumping pattern 18 is set and the material is charged into the upper surface in the side of the blast furnace 14, by using and circulating a distributing chute 16 whose starting and stopping of rotation and the rotation speed are controlled. That is, the distributing chute 16 arranged within the blast furnace 14 below the flow rate control gate 12, so that the locus of the top of the distributing chute 16 coincides with the dumping pattern 18.

Moreover, the angle of inclination of the distributing chute 16 is also controllable during rotation at the given rotation speed.

Therefore, regarding the material charging using such a distributing chute 16, the material distribution within the blast furnace 14 can be regulated by controlling the rotational speed and the inclination angle of the distributing chute 16.

In order to form the given material distribution within the blast furnace 14 in the case of charging the material into the blast furnace 14 by the above-mentioned method, it is important to secure the accuracy of a "charge stop" in which the time points of dumping start point S and dumping end point E in the dumping pattern 18 coincide with those of the start and stop of practical material dumping respectively, the control accuracy of charging speed, and the improvement of the positioning accuracy of the dumping start point S and the dumping end point E.

In order to secure the accuracy of the above "charge stop", it is usually required that a flow rate control gate 12 is opened at a given opening at the time of reaching the top of the distributing chute 16 to the dumping start point S in the dumping pattern 18, and the distributing chute 16 is rotated by an angular velocity omega and its inclination angle theta is varied. After being rotated by a predetermined number of times, the top of the distributing chute 16 coincides with the dumping end point E at the dumping pattern 18, and simultaneously the material dumping is completed.

But, it is very difficult to rotate the distributing chute 16 a predetermined number of times so that its top coincides with the dumping end point E, and to control "the charge stop" so as to complete the practical material dumping simultaneously.

Namely, when the degree of opening of the flow rate controlling gate 12 is made too small, the material M remains in the furnace top bunker 10 even if the rotation of prescribed times is finished, and then the condition of overchute occurs where the distributing chute 16 has to be rotated more times than prescribed in order to charge the total quantity of the material M.

On the contrary, if the degree of opening of the flow rate control gate 12 is made too large, the material M becomes consumed before the top of the distributing chute 16 has reached the predetermined dumping end point E, and the condition of underchute occurs where the distributing chute 16 cannot be rotated by the prescribed times.

Irrespective of the overchute condition and the underchute condition, the balance of the locus of the material dumping in the circumferential direction inside the furnace is disturbed, and a predetermined material distribution in the furnace cannot be formed.

The above-mentioned charge stopping is controlled, for example, in Japanese Utility Model Publication No. 38424/1984 as follows.

First, the completion of the material dumping from the furnace top bunker 10 is determined according to, for example, an acoustic sensor of vibration acceleration pickup type installed in the vicinity of the flow rate control gate 12 and the change of dumping ratio of a load cell installed on the furnace top bunker 10. Thus the numbers of rotations required for the actual material dumping can be determined.

Next, the difference between the predetermined of rotations and the actual number of rotations is determined, and overchute or underchute is determined.

If it is overchute, the degree of opening of the flow rate control gate 12 for the next dumping would be manually made larger by an amount corresponding to the deviation in the last dumping. On the contrary, if it is underchute, the degree of opening would be manually made smaller.

Also, a method of controlling by learning regulation of the degree of opening is known as described in Japanese patent application laid-open No. 47506/1981.

In all of the methods of controlling the accuracy of the charge stopping in the prior art as above described, the degree of opening of the flow rate control gate at the next dumping is regulated based on actual results of the numbers of rotations.

FIG. 22 shows relation between the material dumping speed and the dumping completion time in the case of controlling the material dumping according to these methods in the prior art. Axis of abscissa shows time, and axis of ordinate shows dumping speed at the time of dumping the material from the furnace top bunker.

In FIG. 22, solid line shows an example when charge stopping accuracy is high, and the material dumping from the furnace top bunker is completed at the determined dumping time A.

On the other hand, broken line shows an example where dispersion of the weighing accuracy in the case of weighing the material upstream of a furnace top bunker causes the outer disturbance of the material dumping control. In this example, the material weight is small and underchute takes place. Therefore, when the actual number of rotations of the distributing chute is less than that prescribed as above, the control lessens the degree of opening at next dumping.

Also, the one dot chain line shows an example where changes of physical attributes, e.g., kinds of material (brand), grain size, moisture or the like cause the outer disturbance. In this example, the dumping speed is slow and overchute takes place. Therefore, when the actual circling number of rotations of the distributing chute is more than that prescribed above, the control enlarges the degree of opening in the next dumping.

Further, various techniques are also disclosed as techniques for improving the accuracy of the dumping speed of material, position of the dumping start point and position of the dumping end point.

For example, in Japanese patent application laid-open No. 47506/1981, a technique is disclosed where the next degree of opening of the flow rate control gate valve is learned and calculated based on information of the chute rotation numbers accumulated in the past and the last degree of opening of the flow rate control gate valve, the rotation speed being kept constant, or the rotation speed is learned and calculated, the degree of opening of the flow rate control gate valve being kept constant.

According to the technique having been disclosed in Japanese patent application laid-open No. 47506/1981, even if variation of the physical properties of materials or the mechanical wear of the flow rate control gate valves and the chute guides occurs, the accuracy of the material dumping speed into the blast furnace can be improved by equally dumping materials at the given rotation number exactly by learning.

Also Japanese utility model publication No. 38424/1984 discloses a technique where in a material charging device of a bellless type blast furnace for charging materials through a plurality of furnace top bunkers, assembled chutes and a slewing chute leading into the blast furnace. A mass meter and a pressure meter are provided on the furnace top bunkers, and an acoustic sensor or a vibration meter is provided below the assembled chutes. Detection of the dumping completion and measurement of the dumping duration time are carried out using the acoustic sensor or the vibration meter. The set dumping duration time is compared with the actual dumping duration time and opening degree of flow rate control gate at the time of next material dumping is controlled.

According to the technique disclosed in Japanese utility model publication No. 38424/1984, the actual dumping duration time having high accuracy can always be obtained and the dumped material distribution within the blast furnace can be adequately controlled without being influenced by the clogging of material in the bunkers, the kinds of materials and the variation of physical properties of the materials.

Moreover, when the distributing chute 16 transfers between circular rings of a dump pattern 18, the distributing chute 16 must be inclined smoothly, in order not to vibrate to the material M on the distributing chute 16, and the distributing chute 16 must be inclined rapidly, in order not to dump useless materials onto the locus of the transfer between the circular rings.

Conventionally, the control of the tilted operation of the distributing chute 16 has been carried out by a method shown in FIG. 23 and FIG. 24.

FIG. 23 shows the case that the top end of the distributing chute 16 transfers from the outer circular ring "a" with the inclination angle of the distributing chute 16 being constituted by "a" degrees to the inner ring "b" with the inclination angle being constituted by "b" degrees. Also FIG. 24 shows the relation between the inclination angle (distance deviation) and the inclining speed of the distributing chute 16 during transfer.

That is, the distributing chute 16 is accelerated by the highest speed Vmax at the starting time point transferring from the inclination angle "a" degrees, and when the inclination angle deviation (a-b) between transfer of the distributing chute 16 has reached 1 degree, the inclining speed is reduced to 1/10 of the highest speed Vmax. Further, at the time point of the angle deviation between transfer reaching 0.1 degree, that is, at the time point reaching 0.1 degree before the inner circular ring "b" of the dump pattern 18, the power supply is interrupted and the inclined motion of the distributing chute 16 is braked and stopped. Thus the transfer from the outer circular ring "a" to the inner circular ring "b" is carried out. Moreover, the generally applied values shall be represented regarding numerical values of the inclining speed and the inclination angle of the distributing chute 16.

However, the material charging control method at the top of the blast furnace as above described has the following problems.

Usually, materials should be weighed at the upstream of the furnace top bunker, but the material weight of the furnace top bunker varies slightly every dump causing inaccuracies. Therefore it is impossible to control the material dumping with good accuracy in response to its weight variation.

Moreover, the dumping speed and positions of the dumping start point and the dumping end point vary depending on the variation of grading of material and quantity of moisture included in the material and physical properties. Thus the control of the material dumping is difficult and imprecise.

That is, the grading of such material, moisture included in the material and physical properties of the material vary with time during the material dumping. Therefore, when the material is to be dumped into the blast furnace, the variation of the grading of such material, moisture included in the material and physical properties must be determined by real time, and the degree of opening of the flow rate controlling gate or the like must be regulated.

Nevertheless, regulation of the degree of opening of the flow rate controlling gate and correction of the opening degree regulation are carried out for each successive material dumping as described in the above Japanese patent application laid-open No. 47506/1981 and utility model publication No. 38424/1984. That is, even if the characteristics of the material dumping control vary, this cannot be detected before the material dumping of one time has been completed. Moreover, detection of variation of the material dumping control can only be at the time of next material dumping Further, the conventional technique as described above is not satisfactory regarding the point of keeping a suitable gas stream distribution. There is a relationship between the dumping speed of material being dumped into a blast furnace and the grain diameter of the material as follows.

(dumping speed V)×(grain diameter D)= approximately constant    (1)

That is, the smaller the grain diameter D of material being dumped is, the higher the dumping speed V becomes. As a result, a great deal of materials are dumped and piled up, so gas flow becomes smaller. On the other hand, the larger the grain diameter D of material being dumped is, the lower the dumping speed V becomes, and materials being dumped into a blast furnace become less, so gas flow becomes larger.

Therefore, even if there is a slight variation in the grain diameter of material being dumped into a blast furnace, gas flow distribution from furnace walls up to the furnace center within the blast furnace varies greatly.

Moreover, even if the dumping speed for materials being dumped can be controlled at a definite level, there is a problem that gas flow distribution in the blast furnace cannot be maintained correctly in the case of variation of grain diameter of materials being dumped.

For example, if the distribution of grain diameters of materials being dumped into the blast furnace is in that fine grains are on the side of furnace walls and coarse grains are on the side of the furnace center, the gas flow distribution will be strongly shifted to the side of the furnace center.

Even if the charge stopping accuracy is higher, since the drop volume of materials on the locus of bellless dump pattern is varied in the case of variation of the dumping speed the desired distribution of materials in the furnace cannot be Moreover, concerning the feedback control in which the degree of opening of the flow rate control gate at the dumping is determined by the actual results of dumping of the last time, it cannot be guaranteed that the actual results of material weights and dumping speeds of the last time can be correctly reproduced in the next dumping.

Further, regarding the above-mentioned control method of the distributing chute inclined operation, the distributing chute 16 and the material M on the distributing chute 16 are subjected to large vibration, as acceleration is made at the highest speed Vmax suddenly when the transfer of the distributing chute 16 starts from the outer circular ring "a". This vibration occurs when the inclining speed is suddenly reduced to (1/10) Vmax at the same time the inclination angle deviation reaches 0.1 degree.

Also since the distributing chute 16 is inclined at the position of (1/10) Vmax after the deceleration time, approximately six seconds are required to reach the position of the angle deviation 0.01 degree between the transfer, and the transfer locus of the distributing chute 16 becomes the length of approximately one rotation as shown in FIG. 23. Consequently, the distributing chute 16 dumps large amounts of undesired material M onto the transfer locus.

Further, as the speed of (1/10) Vmax is too large to stop the distributing chute 16 suddenly, the top of the distributing chute 16 does not stop on the inner circular ring "b" exactly, even if the distributing chute 16 is braked at the time point reaching 0.1 degree before the inner circular ring "b" of the dump pattern 18, and the position accuracy of the distributing chute 16 for the inner circular ring "b" is low and limited to plus or minus 0.1 degree at most.

Thus, in the conventional control method of the distributing chute inclined operation, as the distributing chute 16 and the material M on the distributing chute 16 are subjected to vibration, and large amounts of undesired materials M are dumped between the circular rings "a", "b", and further the position accuracy of the circulating chute 16 for the inner circular ring b is low, a problem occurs in that the desired distribution of materials in the furnace cannot be obtained.

SUMMARY OF THE INVENTION

The present invention solves the above-mentioned problems in the prior art. A first object of the invention is to provide a control method of and an apparatus for material charging at the top of a blast furnace in which material can be charged at a specified dumping speed and with a high accuracy regarding each dump in spite of the variation of physical properties of the material.

A second object of the present invention is to provide a physical property determination method of materials in which physical properties of materials to be charged are determined. Even if there are some influences due to variation of properties of materials being charged, such as dumping speed control of materials or the like, the control accuracy can be improved by the decision results.

A third object of the present invention is to provide a material charging control method in which gas flow distribution within a furnace can be kept constant, even if control characteristics are subject to influences due to variation of the physical properties of materials being charged or even if variation of the physical properties has occurred.

A fourth object of the invention is to provide a distributing chute inclining shift control method in which smooth transfer start and transfer stop can be carried out when the distributing chute transfers between circular rings of dump patterns, and desirable material distribution within the furnace can be obtained by quick and correct transferring.

The present invention accomplishes the first object in that in a material charging control method at the top of a blast furnace where materials stored in a furnace top bunker are charged through a flow rate control gate into the blast furnace in a specified time. The value of the initial material weight before the start of dumping divided by the specified time is set as a target dumping speed, and the degree of opening of the flow rate control gate is feedback controlled based on the actual measured weight of materials during dumping, in order that the actual dumping speed after the start of dumping coincides with the target dumping speed.

Also the present invention accomplishes the first object more securely in that remaining material weight in the furnace top bunker is actually measured at the midway point of dumping, and the value of the remaining material weight divided by the remaining time is set as a second target dumping speed, and the degree of opening of the flow rate control gate is feedback controlled based on the actual measured weight during dumping, in order that the second actual dumping speed after the actual measurement of the remaining material weight coincides with the second target dumping speed.

Further, the present invention accomplishes the first object in that the degree of opening of the flow rate control gate is corrected according to the physical properties of materials.

The present invention accomplishes the second object in that the degree of opening of the flow rate control gate is detected, and the dumping speed of materials dumped from the flow rate control gate into the blast furnace is detected, and physical properties dumping of materials dumped from the flow rate control gate into the blast furnace is detected, and physical properties of materials being dumped are determined according to these detected degree of opening of the flow rate control gate and the dumping speed of materials.

The present invention accomplishes the third object in that the degree of opening of the flow rate control gate is corrected according to the physical properties of materials or the gas flow rate within the furnace, and the distribution of a ratio of the dumping quantity of materials being dumped to the grain diameter of the materials within the blast furnace is kept constant. Thus, the gas flow rate distribution within the furnace is also controlled at a definite level.

The present invention uses the ratio MV/PV of a manipulating signal MV (Manipulate Variable) corresponding to the degree of opening of the flow rate control gate to the process variable PV being control results of the degree of opening of the flow rate control gate as an index of the physical properties of materials.

Moreover, the dumping of materials is carried out from the outside to the inside using the distributing chute capable of being inclined, by dump pattern forming concentric circular rings.

The present invention accomplishes the fourth object in that when the distributing chute transfers from the outside to the inside between the circular rings of the dump pattern due to the inclining operation, the inclining speed of the distributing chute is continuously accelerated with functions of the transfer time at the time of transfer start, and the inclining speed of the distributing chute is continuously decelerated with functions of the transfer position at the time of transfer stop.

In the present invention, before materials being input into a blast furnace are dumped, the materials are weighed to determine the initial material weight. A dumping speed obtained by dividing the initial weight by a specified dumping time is made a target dumping speed. Material dumping starts at the same time as the start of the material entering. Materials within the furnace top bunker after beginning to enter are measured, and the degree of opening of the flow rate control gate is controlled by feedback based on the material weight actually measured, which is decreasing continuously during dumping, so that the actual dumping speed after the dumping start is coincident with the target dumping speed.

In this way, control of the degree of opening of the flow rate control gate is carried out at real time based on the measured value. For example, weight of the furnace top bunker is measured and data obtained by differentiating processing of the measured value is used. Even if physical properties of materials are varied in each material dump, materials can be dumped with good accuracy at a prescribed dumping speed for each material dump. Thus the dumping speed can be made constant and the charge stopping accuracy can be improved simultaneously and high accurate control accuracy becomes possible.

As dumping of materials is possible when the actual dumping speed corresponds to a target dumping speed, dumping becomes possible for a specified time and at a constant speed. As a result, material dumping within the furnace can be carried out onto the locus of dump pattern with constant material drop quantity and further with charge stopping accuracy, and the material distribution within the furnace having good balance can be formed.

After start of the material dumping, the remaining material weight within the furnace top bunker is actually measured at a midpoint of the dumping, and similar control is carried out based on the remaining material weight. Thus the problems regarding variation of the material weight before charging and variation of the dumping speed can be solved. Also, the flattening characteristics of the dumping speed, not controlled in the past, as well as problem with charge stopping accuracy are solved simultaneously, and the controllability for material distribution in the bellless type blast furnace can be significantly improved.

Further, the degree of opening of the flow rate control gate at the start point of material charging is set to the initial opening value corresponding to the target dumping speed derived from the initial table representing relation between the degree of opening and the dumping speed, and then transferred to the feedback control, thereby stable control becomes possible.

When materials are dumped from the top of a blast furnace, characteristics concerning material dumping control, for example, dumping speed, dumping start position control and dumping end position control, become largely dependent on grain size of material, quantity of moisture included in material and variation of physical properties. Accordingly, detection of physical properties of material is preferably carried out in order to improve the control accuracy of the dumping speed during material dumping into the blast furnace.

FIG. 10 is a graph showing general relation between grain diameter D of material being dumped into a blast furnace and dumping speed V.

In FIG. 10, even when other conditions such as the degree of opening of the flow rate control gate are the same, the larger the grain diameter D of material, the slower the dumping speed V becomes, and the smaller the grain diameter D of material, the faster the dumping speed V becomes.

On the other hand, FIG. 11 is a graph showing general relation between moisture Q included in material being dumped into a blast furnace and dumping speed V.

In FIG. 11, even when other conditions such as the degree of opening of the flow rate control gate are the same, there is a definite relationship between the moisture Q included in the material and the dumping speed V, although it is not so conspicuous in comparison with the relation between the grain diameter D and the dumping speed V in FIG. 10.

That is, as shown in FIG. 11, general characteristics are in that the more the moisture Q included in the material, the faster the dumping speed V becomes.

As explained in this way using FIG. 10 and FIG. 11, even if the degree of opening of the flow rate control gate or the like is unchanged, dumping speeds become different by the differences of the grain diameter of material being dumped and the moisture included in the material.

Therefore, in the detection method of physical properties of material in the present invention, when the dumping speed of material being dumped into a blast furnace is controlled, physical properties of the material being dumped into the blast furnace are made indices using at least the dumping speed.

For example, if a given dumping speed can be considered as a result of the control of the flow rate control gate, the dumping speed set at process variable PV, one index of the physical properties of the material being dumped is as follows.

$$1/PV \qquad (2)$$

According to the index of equation (2), the properties for the opening of the flow rate control gate concerning the control of the dumping speed can be determined. That is, if the value of this index is small, the dumping speed becomes fast, for example, even if the grain diameter is small or the quantity of moisture contained therein is great, and the opening of the flow rate control gate is identical.

Moreover, according to manipulating signal MV (Manipulate Variable) corresponding to the opening degree of the flow rate control gate and process variable PV corresponding to the dumping speed, for example, index of physical properties of material being dumped into can be expressed as follows.

$$MV/PV \qquad (3)$$

Regarding the index indicated in equation (2) and the index indicated in equation (3), relation in a material dumping control method having a constant opening of the flow rate control gate being indicated by symbol A in FIG. 12 and a material dumping control method having a constant dumping speed of material being dumped into a blast furnace being indicated by symbol B is as follows.

In FIG. 12, it is assumed that grain diameter D of material being dumped into a blast furnace is increasing according to elapsed time T, as indicated in symbol C.

Also in FIG. 12, the symbol A indicates a material dumping control method in which opening of the flow rate control gate is constant. That is, in the symbol A, the opening phi of the flow rate control gate is constant irrespective of the elapsed time T, but the dumping speed V is decreasing according to the increase of the grain diameter D.

Further, the symbol B in FIG. 12 indicates a material charging control method in which dumping speed of material being dumped into a blast furnace is constant. That is, in the symbol B, the dumping speed V is also controlled to a constant value irrespective of the elapsed time T. On the other hand, the opening phi of the flow rate control gate becomes larger according to the increase of the grain diameter D so that the dumping speed V is made constant.

In such a material charging control method with constant opening of the flow rate control gate as shown in the symbol A, the opening $\phi$ of the flow rate control gate in one dump, that is, the manipulation signal MV value is constant, and as dumping speed V, that is, as process variable PV value, a mean dumping speed in one dump can be used.

Also in a material charging control method having a constant dumping speed of material being charged into a blast furnace as shown in the symbol B of FIG. 12, the dumping speed V, that is, the process variable PV value is constant, and the opening $\phi$ of the flow rate control gate, that is, the manipulation signal MV value varies according to the elapsed time. Therefore, in the material charging control method having the constant dumping speed of material being charged into the blast furnace, it is somewhat difficult to get the representative value during one dump for MV values varying on real time during one dump.

Therefore, the index of the equation (2) can be used effectively in the case of a constant opening of the flow rate control gate, as well as, in the case of a constant dumping speed of material being charged into a blast furnace.

On the other hand, the index of the equation (3) can be applied more effectively to the material charging control method having constant opening of the flow rate control gate in comparison with the material charging control method having constant dumping speed concerning material being charged into a blast furnace.

That is, both in the index of the equation (3) and in the index of the equation (2), in order to assume (determine) the physical properties (indices) of material better, in the material charging control method with constant opening of the flow rate control gate, the material charging control method with constant dumping speed of material being charged into a blast furnace or other material charging control method, it is preferable to seek for the opening phi of the flow rate control gate, that is, the manipulate signal MV, and the dumping speed, that is, the process variable PV, more on real time.

An example of the method of seeking for the manipulation quantity MV and the process variable PV substantially on real time will be explained using FIG. 9 as follows.

FIG. 9 is a graph showing variation of material weight in the furnace top bunker during one dumping and the opening of the flow rate control gate with the passage of time.

In FIG. 9, the material weight W is measured by a load cell 22 provided in the furnace top bunker 10 as shown in FIG. 7. Also the opening phi of the flow rate control gate is measured by an opening detector 122 as shown in FIG. 7.

In FIG. 9, the material having weight W1 is stored in the bunker 10 at the time of dumping start $t_1$.

At the time $t_1$, if the flow rate control gate 12 is opened to the opening degree $\phi_1$ and the material dumping to the blast furnace 14 is started, the material stored in the furnace top bunker 10 is decreased.

The weight of the material stored in the furnace top bunker 10 is W2 at the time $t_2$, is W3 at the time $t_3$, and becomes W4 (nearly equal to zero) at the time $t_4$. The opening of the flow rate control gate during one dump is $\phi_2$ at the time $t_2$, is $\phi_3$ at the time $t_3$, and is $\phi_4$ at the time $t_4$.

In the example shown in the graph of FIG. 9, the opening $\phi$ of the flow rate control gate being the manipulation quantity MV and the dumping speed V of material being dumped into the blast furnace, being the process variable PV, are intended to be sought as a mean value of the three time sections. That is, the manipulation quantity MV and the process variable PV are sought as a mean value in each of the three time sections $t_1-t_2$, $t_2-t_3$, $t_3-t_4$ totally. Therefore, the manipulation quantity MV and process variable PV can be measured more on real time in comparison to that being sought as a mean value through one dump as is conventional.

In such time sections, the dumping speed V of material being dumped, being process variable PV is as follows.

A. time section $t_1-t_2$ $$(W1-W2)/(t_2-t_1) \quad (4)$$

B. time section $t_2-t_3$ $$(W2-W3)/(t_331\ t_2) \quad (5)$$

C. time section $t_3-t_4$ $$(W3-W4)/(t_4-t_3) \quad (6)$$

Moreover, in each time section, the opening $\phi$ of the flow rate control gate being manipulation quantity MV can be obtained as follows.

A. time section $t_1-t_2$ $$(\phi_1+\phi_2)/2 \quad (7)$$

B. time section $t_2-t_3$ $$(\phi_2+\phi_3)/2 \quad (8)$$

C. time section $t_3-t_4$ $$(\phi_3+\phi_4)/2, \quad (9)$$

That is, the opening phi of the flow rate control gate being manipulation quantity MV in each time section becomes the mean value in each time section.

In process variable PV of such formulas (4)-(6) and manipulation quantity MV for formulas (7)-(9), indices corresponding to formula (2) for examples can be expressed as follows.

A. time section $t_1-t_2$ $$\{(\phi_1+\phi_2)(t_2-t_1)/2 \times (W1-W2)\} \times \alpha \quad (10)$$

B. time section $t_2-t_3$ $$\{(\phi_2+\phi_3)(t_3-t_2)/2 \times (W2-W3)\} \times \alpha \quad (11)$$

C. time section $t_3-t_4$ $$\{(\phi_3+\phi_4)(t_4-t_3)/2 \times (W3-W4)\} \times \alpha \quad (12)$$

Where, $\alpha$ is a coefficient for adapting level as a grain diameter, unit system of opening (degree)/dumping speed (ton/hour) being coordinated.

As above described, by the results of determination of physical properties of material according to the opening of the flow rate control gate and the dumping speed of material being charged into a blast furnace by using such indices mentioned above, for example, even if there are some influences of the physical properties of material being charged, such as dumping speed control of material, the improvement of the control accuracy can be carried out based on the determination results.

Moreover, one of the material charging control methods according to the present invention has been attained with the idea that physical properties of material being charged must be determined and the control accuracy of the dumping speed must be improved, in order to regulate the distribution of material being dumped into a blast furnace correctly.

This material charging control method has been invented by finding that dumping of material should be controlled to maintain the gas flow rate within the blast furnace at a constant rate, in order to utilize efficiently the inherent heat and reducing capabilities of the gas in the blast furnace.

For example, in the material charging control method having a constant opening of the flow rate control gate in the symbol A of FIG. 12, the dumping speed V becomes slower, as the grain diameter D becomes larger according to the elapsed time T.

As the dumping speed V of material becomes slower in this way, the layer thickness of material piled up within the blast furnace becomes thinner.

In the part of material having a thick layer piled up within the blast furnace, the gas flow is suppressed. On the other hand, in the part of material piled up having thin layer, the gas flow becomes greater and the gas flow distribution becomes unstable from the furnace wall to the furnace center within the blast furnace due to the variation of the grain diameter D of material according to the elapsed time T.

Also as shown in the symbol B of FIG. 12, even if material charging control is carried out so that the dumping speed of material being dumped into the blast furnace becomes constant, when the grain diameter D varies according to the elapsed time T as shown in the symbol C of FIG. 12, a problem takes place in that the gas flow distribution in the blast furnace is varied, as the grain size distribution of material in the blast furnace is under unhomogeneous conditions and the thickness of piled up layer of the material becomes homogeneous.

Accordingly, in one of the embodiments of the present invention, distribution of the ratio of the dumped quantity and the grain size of material being dumped on each part of the upper surface within the blast furnace is kept constant, thereby the gas flow distribution in the blast furnace is also made constant. That is, control of the opening phi of the flow rate control gate is carried out so that the following equation may hold good, concerning the dumping speed V of material being dumped into the blast furnace and the grain diameter D of the material.

$$\text{(dumping speed V)/(grain diameter D)} = \text{approximately constant} \quad (1)$$

That is, when the grain diameter of material being dumped into the blast furnace is large, the dumping speed is made slow and the layer thickness of material being piled up within the blast furnace is thinned. On the other hand, when the grain diameter of material being dumped into the blast furnace is small, the dumping speed of the material into the blast furnace is made fast and the layer thickness piled up within the blast furnace is made thicker.

Such a material charging control method of the present invention involving the distribution of ratio of the dumping quantity to the grain diameter of material will be explained using FIGS. 14–16.

FIGS. 14–16 are graphs concerning variation with regard to time during an identical dumping. That is, these graphs indicate variations of the opening phi of the flow rate control gate, the dumping speed V of material being dumped into the blast furnace and the grain diameter D of the material being dumped into the blast furnace with regard to the elapsed time T, respectively.

Moreover, the dumping of total three kinds of materials is shown by symbols A–C in FIGS. 14–16. That is, identical symbols correspond to the dumping of identical materials in FIGS. 14–16.

Concerning dumping of the three kinds of materials indicated in symbols A–C in FIGS. 14–16, the grain diameter D of material varies according to the elapsed time T, as shown in FIG. 16.

That is, regarding the material dumping indicated by symbol A which is the basic condition, the grain diameter D has slowly enlarging characteristics according to an elapsed time T as shown in FIG. 16. Also regarding the material dumping indicated by symbol B, the grain diameter D of material being dumped is enlarged somewhat more rapidly than that of symbol A according to an elapsed time T as shown in FIG. 16. Further regarding the material dumping indicated by symbol C, approximately constant grain diameter D is gained according to an elapsed time T as shown in FIG. 16.

Regarding such dumping of three kinds of materials as shown in FIG. 16, when the material charging control method of the present invention is applied and a ratio of the dumped quantity to the grain diameter of material being dumping is made constant, variation of the dumping speed V for the elapsed time T becomes as shown in graph in FIG. 15. That is, in the graph of FIG. 15, regarding the dumping of material indicated by symbol A, the dumping speed V concerning the elapsed time T approximately constant. Also regarding the dumping of material indicated by symbol B, the dumping speed V is slowly rising according to the elapsed time T. Further regarding the dumping of material indicated by symbol C, the dumping speed V is slowly decreased according to the elapsed time T.

Moreover, in the dumping of materials of total three kinds indicated by the symbola A–C in FIG. 15, the total dumping quantities of materials are equal, and the material dumping times from the start of material dumping into the blast furnace to the end are made equal to each other. In other words, integrated values according to the elapsed time of the symbols A–C in the graph of FIG. 15 are equal to each other. That is, the mean values of each dumping speed V of dumping of materials of the symbols A–C become equal to each other.

FIG. 14 is a graph showing variation of the opening $\phi$ of the flow rate control gate according to the elapsed time T, when the control of the dumping speed V according to the elapsed time T shown in FIG. 15 is carried out, regarding the dumping of materials indicated by symbols A–C respectively.

That is, regarding the dumping of respective materials of the symbols A–C having characteristics of variation of the grain diameter D according to the elapsed time T as shown in FIG. 16, control of the opening $\phi$ of the flow rate control gate according to the elapsed time T as shown in FIG. 14 is carried out. Thus, control of the dumping speed V according to the elapsed time T as shown in the graph of FIG. 15 can be carried out, and the ratio of the dumping speed to the grain diameter of the material being dumped into the blast furnace can be made constant. Therefore, the distribution of the ratio the dumping quantity to the grain diameter of material being dumped on each part of the upper surface in the blast furnace can be made constant, and the distribution of the gas flow within the furnace can be controlled constantly, even if the control characteristics are influenced by variation of the physical properties of material being dumped or even if the physical properties have been changed.

Furthermore, in the material charging control method of the present invention, determination of the physical properties of material, that is, the determination method of grain size of material is not limited, but the inventor has found modifications as follows.

A. method of directly detecting using a grain size sensor.

B. method of assuming grain diameter of material using MV value and PV value, determination method of physical properties of material of the present invention being applied.

C. method of assuming variation of grain diameter by gas flow distribution measurement as ultimate result due to dumping control.

Also the method of shifting the dumping speed V of material according to the elapsed time T shown in FIG. 15 may be any of following methods.

A. method of calculating and setting automatically.

B. method of setting through an operator by judgement and calculation of the operator.

Further, concerning measurement (grasping or decision) of the state of variation of the grain diameter D of material being dumped according to the elapsed time T as shown in FIG. 16, or timing of setting change relating to correction by the actual value in relation between the dumping speed V and the opening phi, following methods exist.

A. method of changing the setting instantaneously even during one dumping.

B. method of changing the setting in next dumping and so forth according to results of the last dumping (feedback method of large stream spreading over dumping of plural times).

According to the control method of the distributing chute inclining shift of the present invention, the distributing chute can be accelerated according to the function of transfer time and start the transfer between circular rings smoothly according to and transfer to the transfer stop smoothly the function of the transfer position.

Also since the inclining speed of the distributing chute is decreased smoothly according to the prescribed speed, the distributing chute transfers rapidly between the circular rings.

Further, since the inclining speed of the distributing chute is significantly decreased immediately before the transfer stop, the distributing chute reaches the target position of the circular ring exactly.

As described above, the distributing chute carries out the transfer start and the transfer stop smoothly. Thus the distributing chute or material on the distributing chute is not subjected to vibration. Also since the distributing chute transfers rapidly between the circular rings of the dump pattern, undesired dumping of large amounts of materials M are not dumped between the circular rings does not occur.

Further, since the distributing chute can reach the target circular rings exactly, the position accuracy is extremely high. As a result, desired material distribution within the furnace can be obtained.

BRIEF DESCRIPTION OF THE DRAWINGS

The preferred embodiments will be described with reference to the drawings, wherein like elements have been denoted throughout the figures with like reference numerals, and wherein:

FIG. 10 is a graph showing relation between grain diameter and dumping speed of material being dumped into a blast furnace;

FIG. 11 is a graph showing relation between quantity of moisture contained in material being dumped into a blast furnace and the dumping speed;

DESCRIPTION OF THE PREFERRED EMBODIMENTS

Embodiments of the present invention will be described in detail referring to the accompanying drawings as follows.

Figure 1:
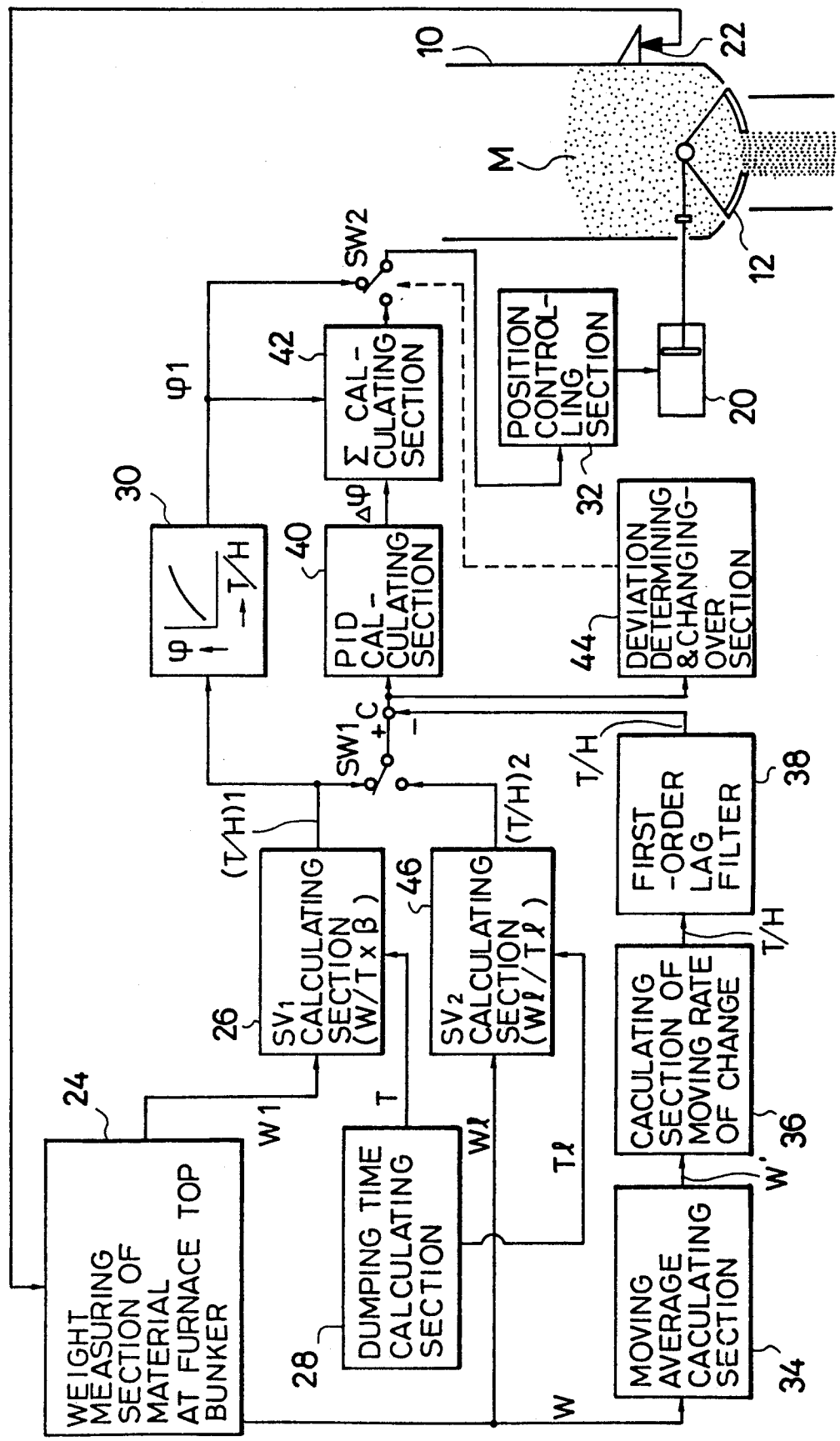
FIG. 1 is an outline constitution diagram showing an example of a control device being applied to an embodiment of the present invention.

FIG. 1 is an outline diagram indicating a material dumping control device being applied to an embodiment of the present invention.

Figure 21:
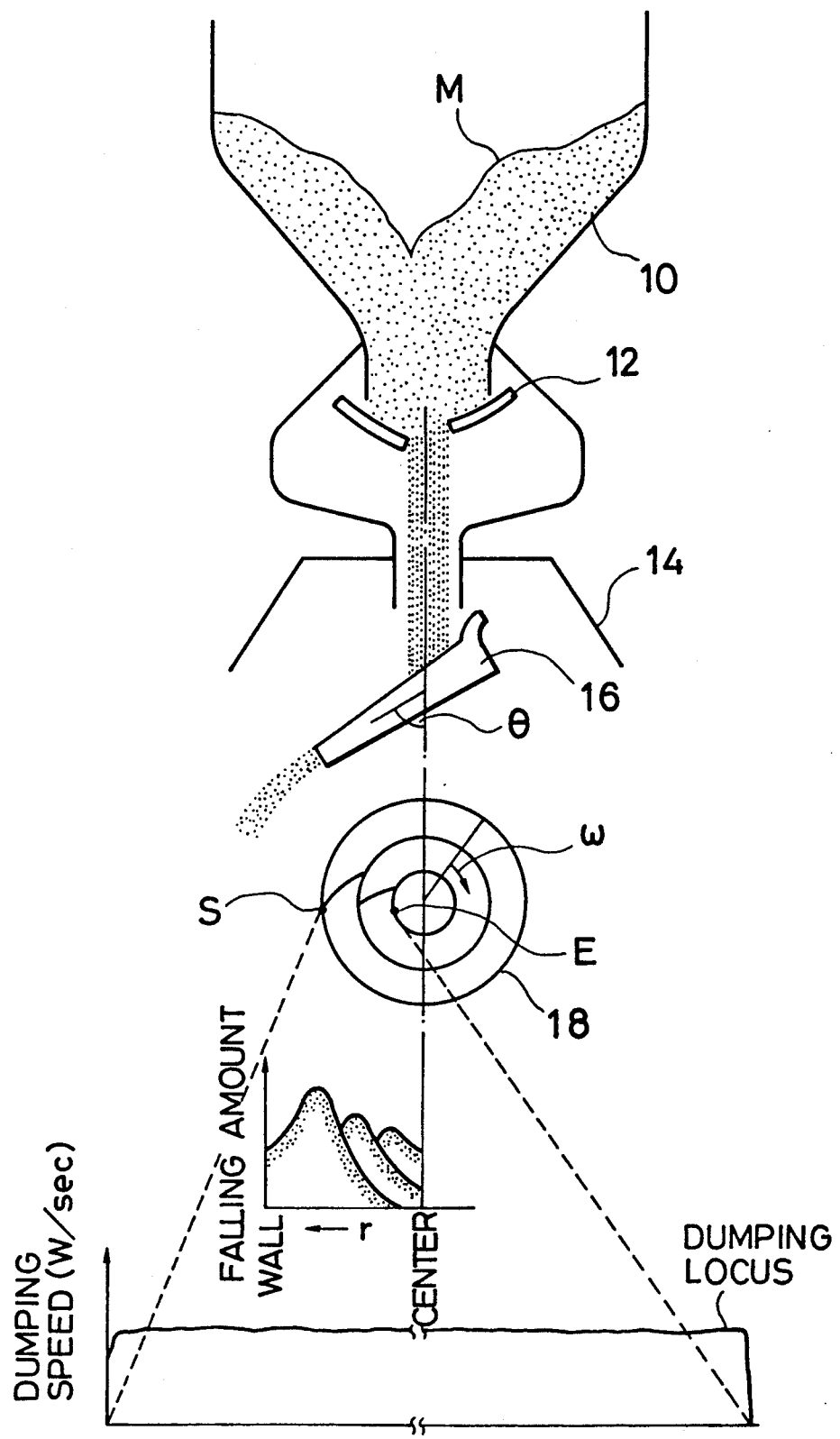
FIG. 21 is an outline explanation diagram explaining material dumping from a furnace top bunker of a blast furnace.

The above-mentioned control device has functions regulating opening of a flow rate control gate 12 being installed near the lower end of a furnace top bunker 10 for material dumping into a blast furnace 14 indicated in FIG. 21.

The furnace top bunker 10 is provided with an oil pressure cylinder 20 for driving the flow rate control gate 12, and a load cell 22 for weighing material M accumulated in the bunker 10.

Method of the embodiment is in that manipulations being explained below are executed by the control device. Based on values of the material weight measured by the load cell 22, the oil pressure cylinder 20 is driven so as to control the amount or degree of opening of the flow rate control gate 12, and material dumping into the blast furnace 14 is carried out.

Figure 2:
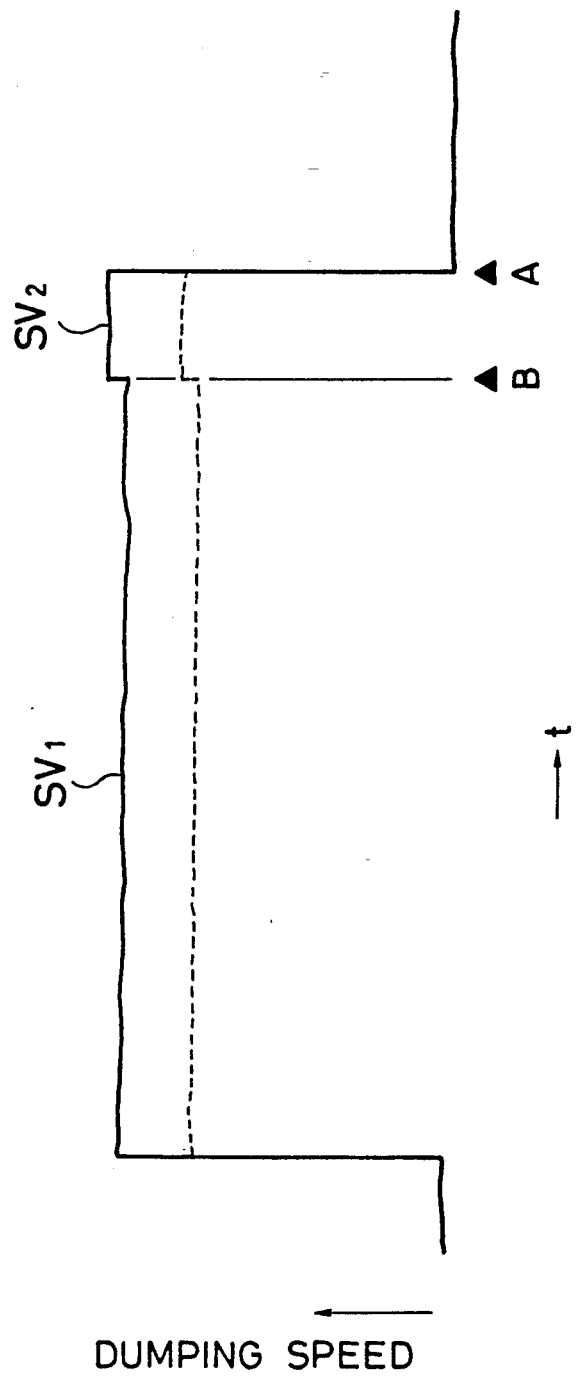
FIG. 2 is a time chart showing time process of material dumping speed in the embodiment.
Figure 22:
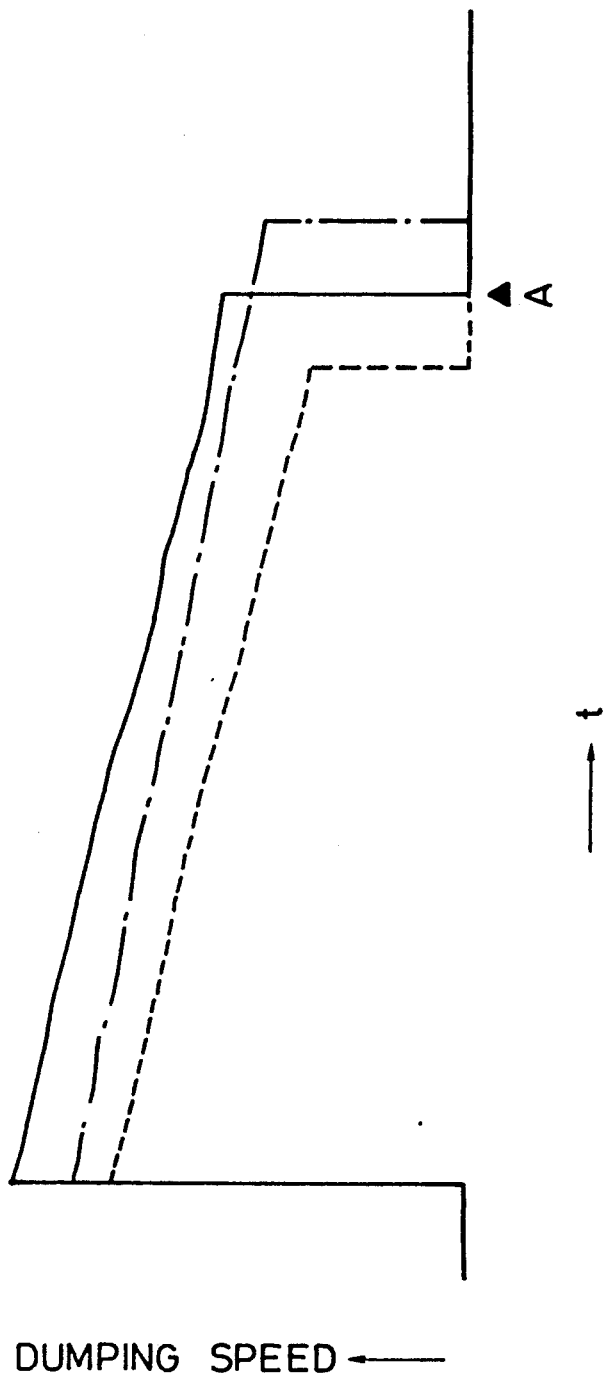
FIG. 22 is a time chart showing time process of material dumping speed in the prior art.
Figure 23:
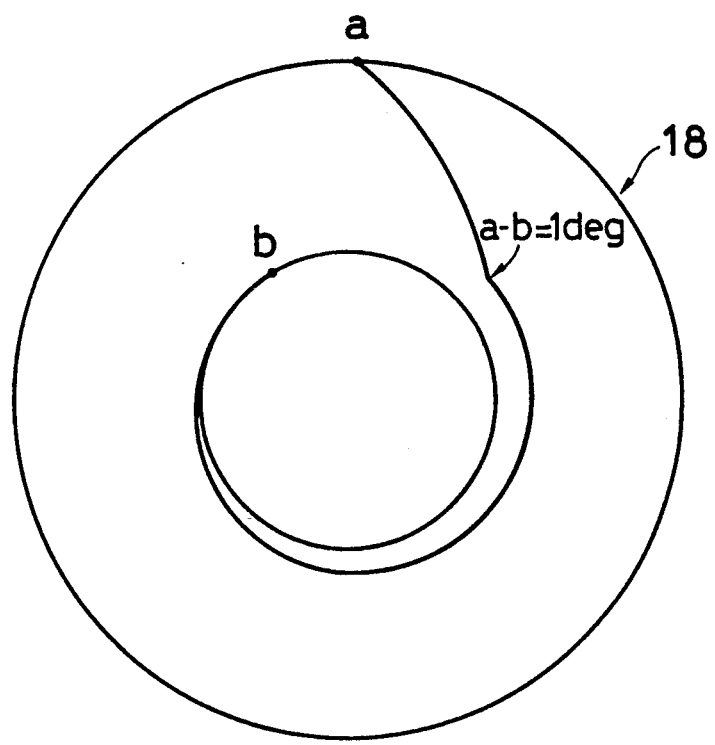
FIG. 23 is a diagram showing dump pattern transfer locus of a distributing chute in control method of inclined operation of a distributing chute in the prior art.

In the embodiment, material dumping control is carried out according to a time chart indicated by solid line in FIG. 2 corresponding to FIG. 22, where dumping speed of material is controlled to a first target value SV1 of constant value up to a time B, and then controlled to second target value SV2 of constant value, and the material dumping is completed in a specified dumping time A.

First, material M is dumped into the furnace top bunker 10, and weight W1 of the material M is measured by calculating processing in a weight measuring section 24 of material at furnace top bunker, based on signals inputted from the load cell 22.

When signals corresponding to the material weight W1 are inputted from the weight measuring section 24 to a calculating section 26 for a first target dumping speed (SV1), division is carried out in the calculating section 26 in relation with a specified dumping time T input by signals from a dumping time calculating section 28 separately, and speed value W1/T is calculated.

The first target calculating section 26 outputs the value of the calculated speed value W1/T multiplied by correction coefficient $\beta$ as first target dumping speed $SV1\{(T/H)_1\}$ to an initial opening calculating section 30.

The dumping time T is determined by a specified dump pattern and rotation speed of a distributing chute, and the correction coefficient $\beta$ is that for securing control width to transfer smoothly to control of rear stage being carried out by setting second target dumping speed (second target a value SV2), and value of $0.9 < \beta < 1.0$ is used for example.

In the initial opening calculating section 30, initial opening value $\phi_1$ of the flow rate control gate corresponding for the first target dumping speed $(T/H)_1$ being input is calculated, and the opening value $\phi_2$ is output through a switch SW2 to a position controlling section 32.

The control section 32 outputs control signals to the oil pressure cylinder 20, and sets the flow rate control gate 12 to the initial opening value $\phi_1$, and starts dumping of the material M at the same time.

Mounted the initial opening calculating section 30 is an initial table which is composed of graphs representing relation between the dumping speed T/H and the opening $\phi$ of the flow rate control gate. The table was previously prepared with information on various kinds (descriptions) of material. The initial opening value $\phi_1$ is calculated based on the table. The flow rate control gate 12 is set to the initial opening value $\phi_1$, followed by rapid and smooth transfer to closed loop control as explained below.

As above described, dumping of the material M is started, and at the same time, detecting signals from the load cell 22 are input continuously to the weight measuring section 24 at the furnace top bunker. At the weight measuring section 24, the material weight within the furnace top bunker 10 which is continuously decreasing is sequentially measured based on the detecting signals. e The material weight W being measured in such ways is input to a moving average calculating section 34, and the material weights W which continuously vary by a minute amount are averaged by the moving average calculating section 34 and then input as stable material weight W' to a calculating section 36 for the moving rate of change at the next stage.

At the calculating section 36 for the moving rate of change, rate of change of the material weight W' is determined in each definite time. That is, the material weight W' is differentiated based on time, thereby the dumping speed T/H of material being dumped from the furnace top bunker 10 through the flow rate control gate 12 into the furnace is calculated. Next, the dumping speed T/H is input to a first-order lag filter 38, and is subjected to filtering processing so that large variation components due to noise are removed from the results of the differentiating processing, and the processed signal is output to a comparison section C and is used as a feedback signal.

At the comparison section C, comparing operation is carried out between the actual dumping speed T/H being inputted from the first-order lag filter 38 and the first target dumping speed $(T/H)_1$ (corresponding to SV1) input from the first target dumping calculating section 26.

When the flow rate control gate 12 is opened and material dumping is started, the PV value being process variable, i.e., the actual dumping speed T/H rises, and when the difference between the actual dumping speed T/H and the first target dumping speed $(T/H)_1$ reaches a certain range, this is determined by a deviation determining and changing-over section 44, and the switch SW2 is changed and the transfer to the condition of feedback control of forward stage occurs.

The switch SW2 is changed with bumpless condition by signals inputted from a PID calculating section 40 and a $\Sigma$ calculating section 42 indicated below. The feedback control for the forward stage is carried out as follows. First, opening correction component $\Delta\phi$ is calculated based on the deviation between the first target dumping speed $(T/H)_1$ being inputted to the PID calculating section 40 and the actual dumping speed T/H, and the correction component $\Delta\phi$ is output to the $\Sigma$ calculating section 42. In the $\Sigma$ calculating section 42, the opening correction component $\Delta\phi$ is sequentially added to the initial opening value $\phi_1$, thereby, the opening control signal is prepared. The opening control signal is output through the switch SW2 to the position controlling section 32 and the oil pressure cylinder 20 is driven, thereby the flow rate control gate 12 is set to the opening corresponding to the opening control signal.

The dumping speed of the material M from the flow rate control gate 12 can be controlled on real time and dynamically in this way.

After the feedback control for the forward stage based on the first target dumping speed $(T/H)_1$ has been carried out up to the time point B in FIG. 2, the switch SW1 is changed and the control is transferred to the feedback control at the rear stage based on the second target dumping speed $(T/H)_2$ (corresponding to SV2) explained below.

First, signals for the remaining material weight W(1) remaining in the furnace top bunker 10 at the time point B are input to a second target value SV2 calculating section 46, and also signals for the remaining dump time T(1) being the difference from the specified dumping time T are input, and second target dumping speed time W(1)/T(1) is calculated at the SV2 calculating section 46. The SV2 calculating section 46 outputs the signal $(T/H)_2$ corresponding to the second target dumping speed W(1)/T(1) through the SW1 to the comparison section C, thereby the feedback control similar to that based on the first target dumping speed $(T/H)_1$ is started with the speed W(1)/T(1) as a target value (SV2).

The time point when the distributing chute has been rotated X times from the material dumping start time point, is chosen as the time point when the feedback control at the rear stage is started, that is, the time point B when the target dumping speed is to be reviewed.

In this case, X is inputted as a set value in advance to the control system, and the remaining dumping time T(1) is also calculated based on the value X.

Regarding the rotation number X, in order that the distribution of the material dumping quantity within the furnace in the circumferential direction is balanced after changing the target dumping speed to SV2 and the material distribution being averaged within the furnace is formed, it is important that the rotation number X is an integer remaining rotation of at least one time before finishing specified times of rotation based on the dump pattern. At the stage that rotation of the distributing chute in integer multiple time remains, the target dumping speed is calculated again, and the dumping speed is controlled to be coincident with the second target value SV2 and the material dumping is carried out, thereby the material dumping can be completed at the specified rotation end position (dumping end point E in the dump pattern in FIG. 21).

Moreover, the rotation number X occurs preferably at the point that the material dumping of 70-80% is completed with respect to the initial weight as calculated before starting the material dumping. When X is less than 70% of the initial weight, deviation is liable to occur between the actual stop position of the distributing chute and the end position in the dump pattern due to the control error after calculating the target dumping speed again, and the charging stop accuracy is liable to be deteriorated. Also if X is more than 80%, since the remaining rotation number of the distributing chute is small, the distribution of the material dumping quantity within the furnace varied with the changing of the target dumping speed deviates in the circumferential direction, and the material dumping distribution within the furnace is unbalanced and the blast furnace operation is liable to become abnormal.

In the embodiment, if the flow rate control gate 12 during the material dumping is operated in the closed direction, it bites the material and a mechanical disturbance is produced. So the flow rate control gate 12 can be easily operated only in the opened direction. As shown in FIG. 22, the material dumping speed is characterized in that the dumping speed is reduced with the lapse of time when the flow rate control gate 12 has the identical opening. Therefore, when the dumping speed is controlled constantly as in the embodiment, the flow rate control gate 12 may be controlled only in the opened direction, and therefore it can be controlled without difficulty.

When the feedback control at the rear stage is carried out as above described, it is important to set respective target values so that relation of SV1 less than or equal to SV2 may be established between the first target dumping speed SV1 and the second target dumping speed SV2. The operation to enable this is the correction coefficient $\beta$ for the first target dumping speed SV1, and this $\beta$ having a value as large as possible is effective to decrease the drop between the first and second target dumping speeds and to enable the smooth transfer to the control at the rear stage.

Such constitution provides a sufficient control margin even in the feedback control at the rear stage, and to secure the flattening characteristics of the dumping speed and the charging stop accuracy.

Next, FIGS. 3–6 show control results in the case that the specified rotation number of the distributing chute is 14, and transfer to the rear stage occurs at the time point of finishing rotation of 11 times after starting the dumping, i.e., at the time point of remaining rotation of three times, and correction coefficient $\beta = 0.97$, in comparison with the conventional case.

Figure 3:
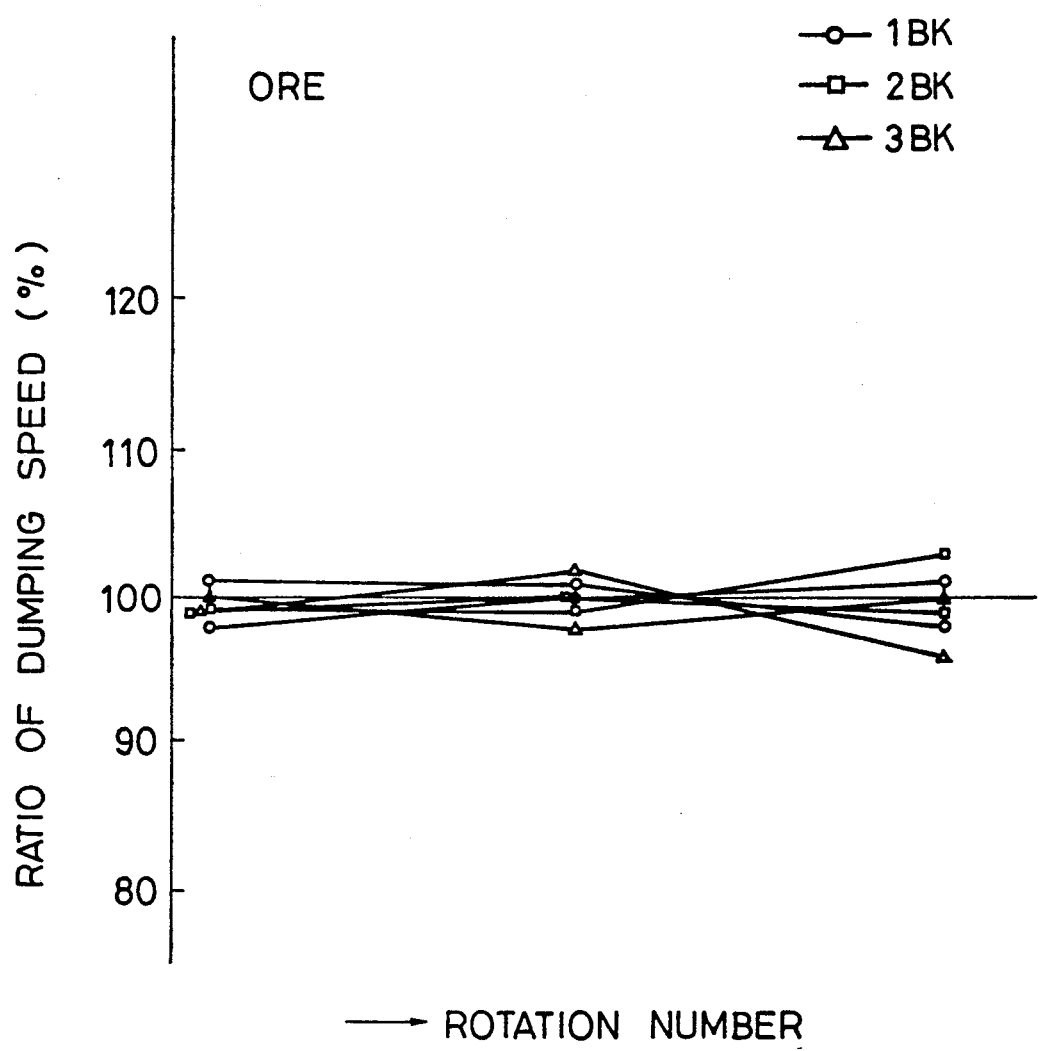
FIGS. 3 to 6 are graphs explaining effects of the embodiment.
Figure 4:
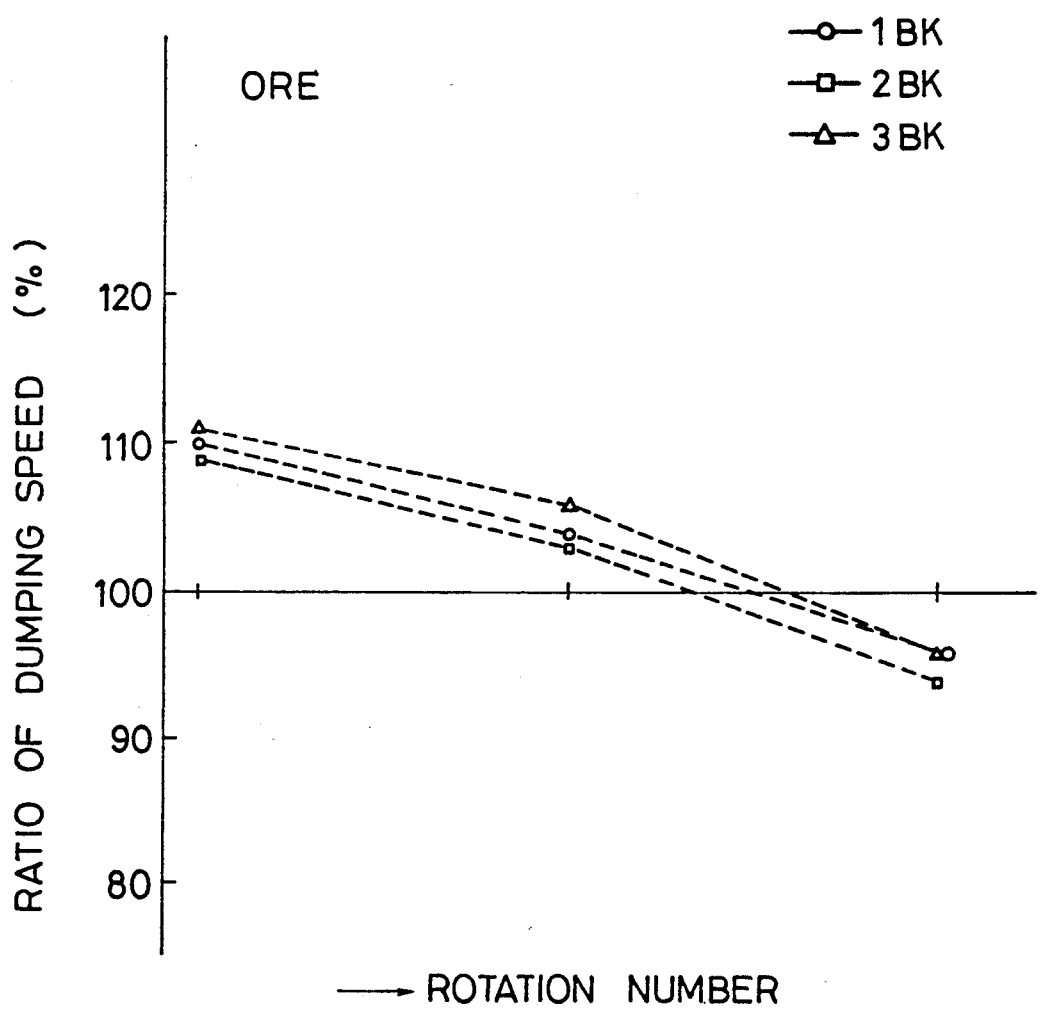
Figure 5:
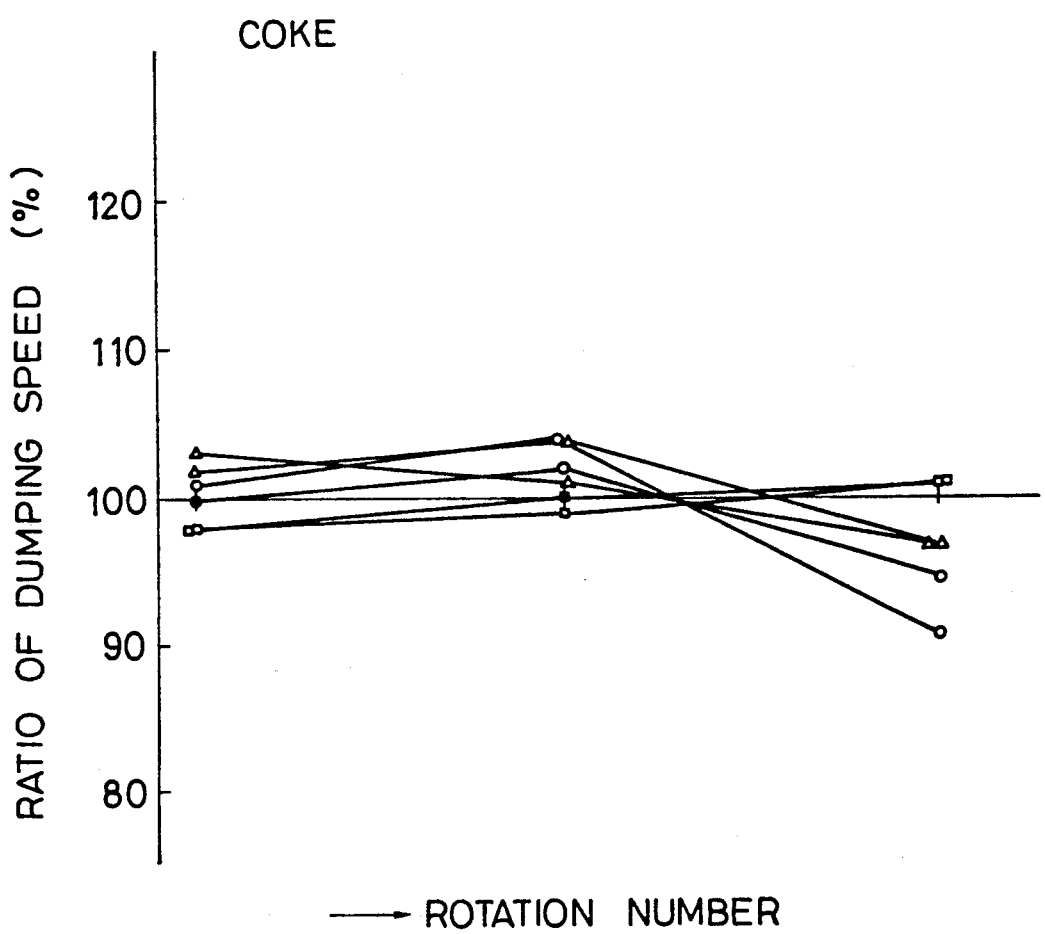
Figure 6:
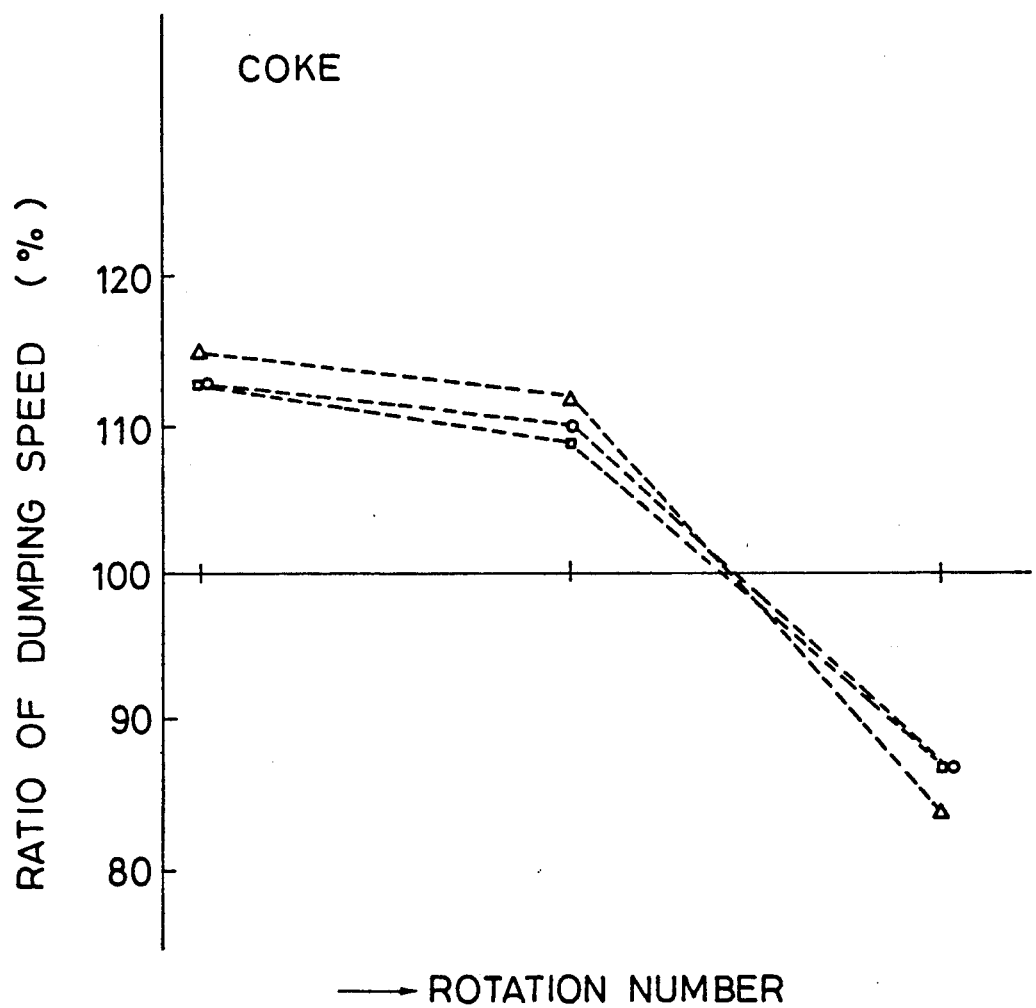

FIGS. 3 and 4 show results of the embodiment and the conventional example in the case of using ores as materials respectively. In the figures, circular, rectangular and triangular symbols indicate the material dumpings of the No. 1, No. 2 and No. 3 bunker respectively. Also FIGS. 5 and 6 show results similar to that in FIGS. 3 and 4, cokes being used as materials respectively.

From the results of FIGS. 3 and 4 and FIGS. 5 and 6, it is clear that the embodiment is extremely superior concerning flattening characteristics of the dumping speed and the charging stop accuracy.

Moreover, regarding the charging stop accuracy, error for the specified rotation number is plus or minus 0.1 rotation in the embodiment, and plus or minus 0.3 rotation in the conventional example.

According to the embodiment as above described in detail, opening of the flow rate control gate is feedback controlled on real time based on the measured value of the material dumping speed. Thus the material dumping can be carried out always at the target dumping speed, and the flattening of the flow rate control gate and the improvement of the charging stop accuracy become possible. Furthermore, the formation of good material distribution within the furnace becomes possible.

After starting the material dumping, the target dumping speed is reviewed at the time point of finishing the rotation of X times of the distributing chute, and then second target value SV2 is newly set and the feedback control at the rear stage is carried out. Therefore, even if the control deviation occurs at the forward stage, the control accuracy can be improved and equally good material distribution is established. Consequently, the operability of the blast furnace can be improved.

Also in the embodiment, as the initial opening of the flow rate control gate 12 is calculated from the initial table prepared in advance, and then the transfer to the feedback control occurs, the stability of the feedback control on real time is increased.

Further, the advanced method using the statistical model being detailed below can be thought of as a material charging control method for the blast furnace.

This method is one that relationship between the material dumping speed (W/T) and the opening ($\phi$) of the flow rate control gate has been depicted on a graph, and plural numbers of relations between the material dumping speed (W/T) (gained by furnace top bunker material weight/dumping actual time of the dumping) and the opening (phi) at that time are sought, every time an actual dumping time is determined and then the graph being made fundamental is sequentially corrected by the least square method.

This method and statistical model determines a rule based on a statistical method, using a lot of data which is corrected from an actual process, because accurate analysis of dumping characteristics is difficult to obtain from the theoretical formula. The above is the model formation method by a regression analysis method generally used.

The object of a regression analysis is to regress one subordinate variable by several independent s variables, and regarding control of the above statistical model, the subordinate variable being the opening ($\phi$) of the flow rate control gate and the independent variable being a material dumping speed (W/T), N sets of data $\{\phi, (W/T)\}$ are corrected and the data are given to the above model. Given $$\phi = a \times (W/T) \times b + \epsilon \qquad (13)$$

, coefficients a, b in which error $\epsilon$ becomes least over all N sets are sought by the least square method.

According to the above method using the statistical model, material dumping speed (W/T) (furnace top bunker material weight of the dump / dumping setting time of bellless pattern) of the material calculated for each dumping. The material dumping speed data are sent to the graph of the statistical model which is then sequentially modified. Then the opening ($\phi$) of the desirable flow rate control gate is output. Accordingly concerning the manual setting method in the past or a method for learning controlling automatically can be solved. This method has the advantage of being able to accurately control the opening ($\phi$), in comparison with the conventional method.

But, the method using the statistical model controls the next opening of the flow rate control gate based on the numbers of the actual rotation. Thus, the method requires processing of enormous numbers of data and a more sophisticated computer (usually a process computer) to be used exclusively for the complicated calculations. Therefore, it is expensive and undesirable because of the control delay required for interfacings and processing times.

Accordingly, adequate control processing cannot be done on real time using a less sophisticated controller as used in the present embodiment.

The present invention has been explained completely as mentioned above, it is needless to say that the present invention is not restricted to the embodiment.

For example, the embodiment describes having a two stage control reviewing the target dumping speed with one stage control setting the first target dumping speed and controlling to the end using the dumping speed being a reference, may be permissible, and further. Also for more than two stages which carry out reviewing more than two times on the way can be performed. In this case, control with more accuracy can be accomplished.

Moreover, when initial weight of material stored in the furnace top bunker before the dumping start is small, the dumping speeds are made smaller as shown by broken line in FIG. 2, and the opening of the flow rate control gate may be controlled as in the case of the embodiment.

Moreover, the material weight being derived from the load cell 22 is differentially processed and dumping speeds are sought in the embodiment, but are not restricted to this. Other operation methods for determining dumping speeds, based on the actual measured values of material weights can be adopted.

Figure 7:
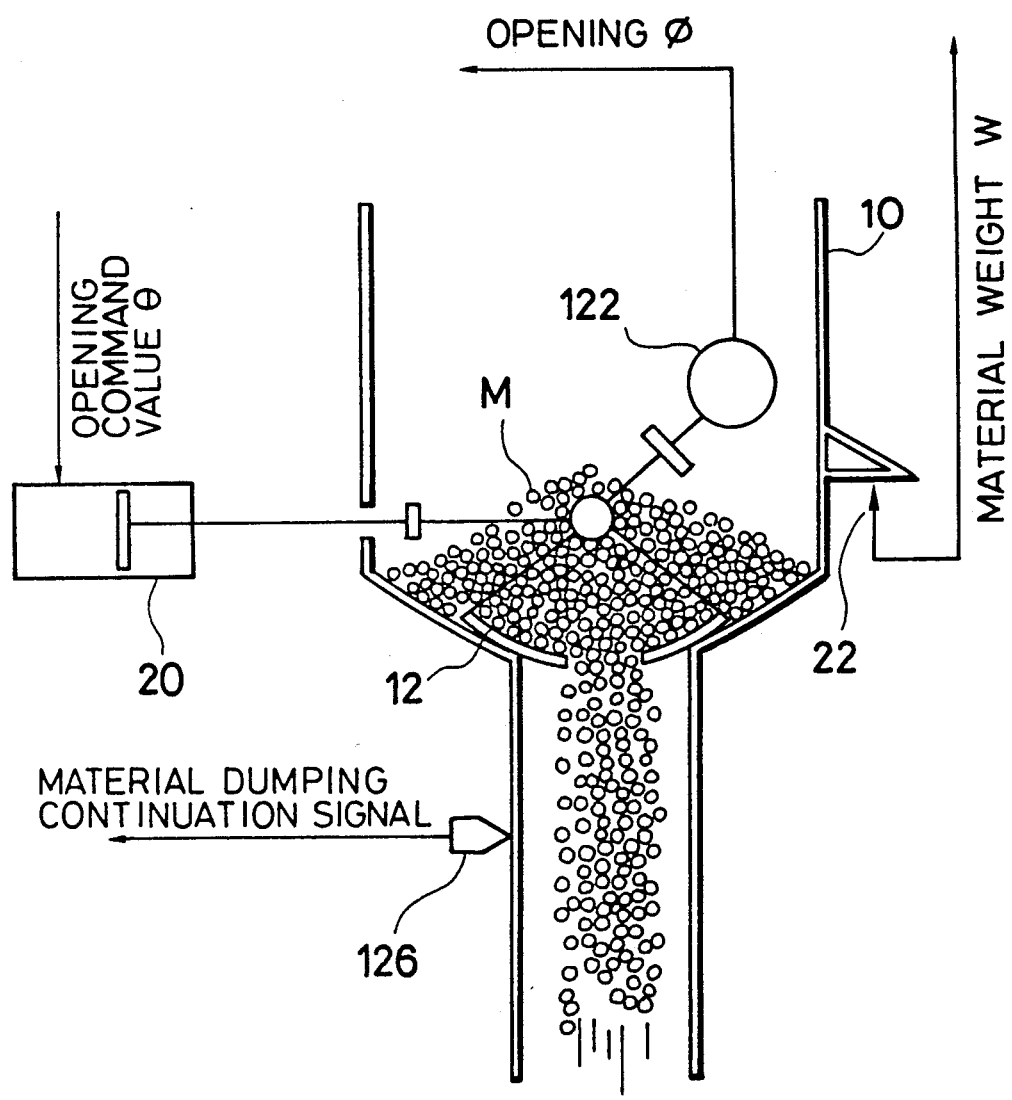
FIG. 7 is a constitution diagram of material charging equipment used in an embodiment of determination method of physical properties of material of the present invention and in another embodiment of material dumping control method of the present invention.

FIG. 7 is a constitution diagram of a material charging device into a blast furnace being used in the embodiment of the physical property determination method of the material according to the present invention and in the other embodiment of material charging control method according to the present invention.

In FIG. 7, reference numerals 10, 12 indicate similar members designated by the same numerals in FIG. 21.

In FIG. 7, the opening of the flow rate control gate 12 is set by the oil pressures cylinder 20 being actuated by the opening command value $\theta$ being input.

Moreover, the opening detector 122 measures the actual amount or degree opening of the flow rate control gate 12 at this time and outputs this measurement as the opening $\phi$.

Moreover, the load cell 22 measures the weight of material M being stored in the furnace top bunker 10 and outputs this measurement as material weight W.

The acoustic sensor 126 detects continuation of the dumping of material from the sound emitted at the falling time of material M falling from the flow rate control gate 12 being mounted below the furnace top bunker 10, and outputs the material dumping continuation signal F.

Figure 8:
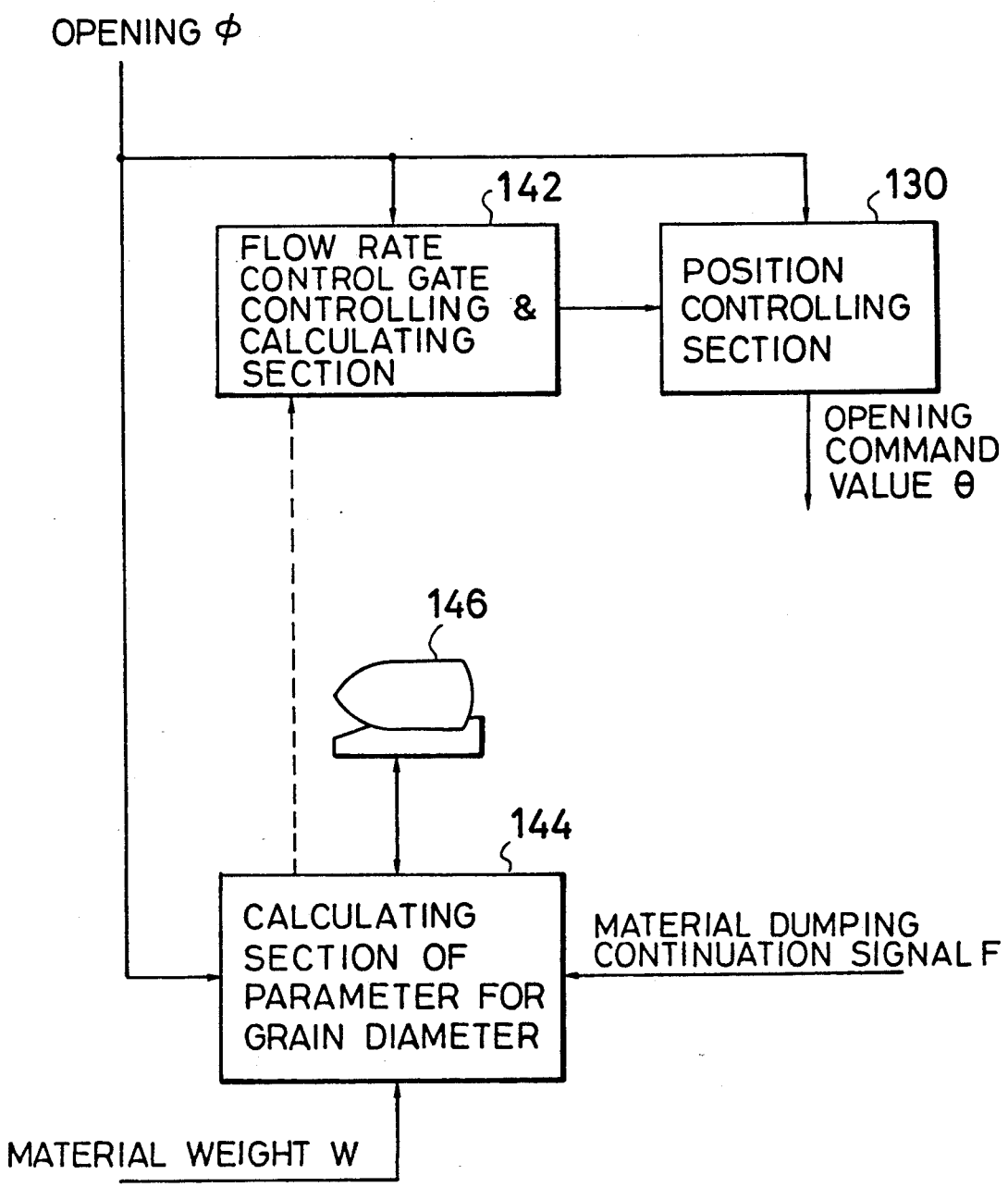
FIG. 8 is a block diagram of an embodiment of determination method of physical properties of material of the present invention.

FIG. 8 is a block diagram for an embodiment for the physical determination method according to the present invention.

Figure 12:
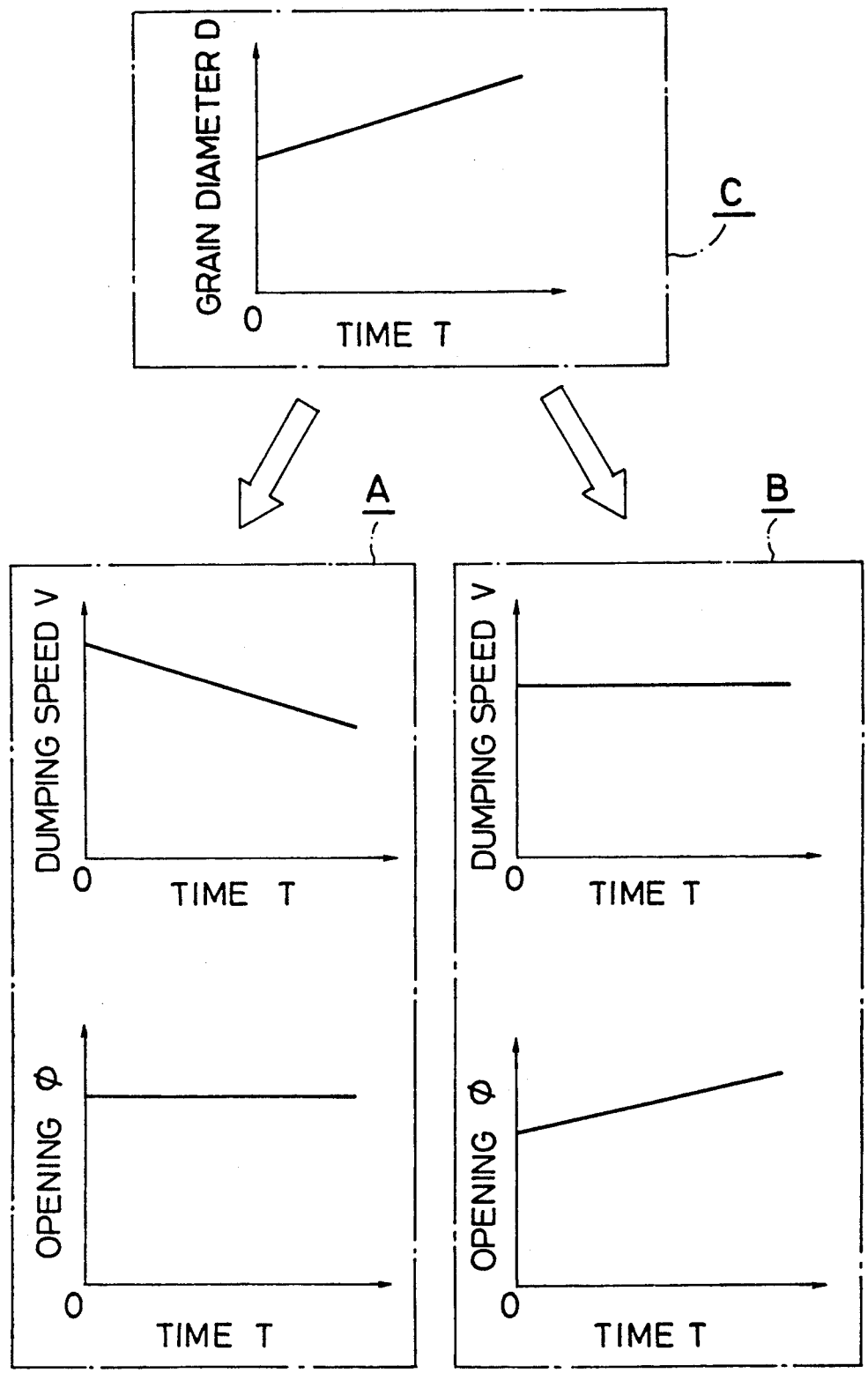
FIG. 12 is a graph explaining the control method of material dumping with constant opening of a flow rate control gate and the control method of material dumping with constant dumping speed of material being dumped into the blast furnace.

In FIG. 8, the flow rate control gate controlling and calculating section 142 carries out material dumping control with constant opening of the flow rate control gate, or material dumping control with constant dumping speed of material being dumped into a blast furnace, using FIG. 12.

Further, a position controlling section 130 carries out feedback control of the opening of the flow rate control gate 12 in FIG. 7 where an opening output signal being output from the flow rate control gate controlling and calculating section 142 is made a command value for feedback control. The opening valve $\phi$ being output from the opening detector 122 in FIG. 7 is made a feedback value for the feedback control, and outputs the opening command value $\theta$ to the oil pressure cylinder 20 in FIG. 7.

A calculating section 144 for grain diameter in FIG. 8 determines the physical properties of materials being dumped, according to the opening of the flow rate control gate and the dumping speed of material.

The calculating section 144 for grain diameter receives the opening signal $\phi$ sent from the opening detector 122. The opening signal $\phi$ represents the opening of the flow rate control gate 12.

Moreover, the calculating section 144 for grain diameter detects dumping speeds of material being dumped into a blast furnace by the operation of inputs of the weight W of material from the load cell 22 in FIG. 7 and material dumping periods (period from start of material dumping to completion) by inputting signal F of the material dumping continuation.

Or, the calculating section 144 for grain diameter calculates the dumping speed of material based on the varying quantity $\Delta W$ of the material weight W for a given time. The material dumping is confirmed by the acoustic sensor 126.

Moreover, the physical property determination method being carried out in the calculating section 144 for grain diameter operates using the grain diameter indicated in formulas (10)–(12).

Further, obtained data for grain diameter is provided from a display 146, and correction valves are determined specified appropriate actuation (correction).

Moreover, data on grain diameter detected by section 144 is output to the flow rate control gate controlling and calculating section 142 and accuracy of control of the flow rate control gate 12 is improved. That is, information concerning the data for grain diameter is determined on real time and the feedback control is carried out.

Figure 9:
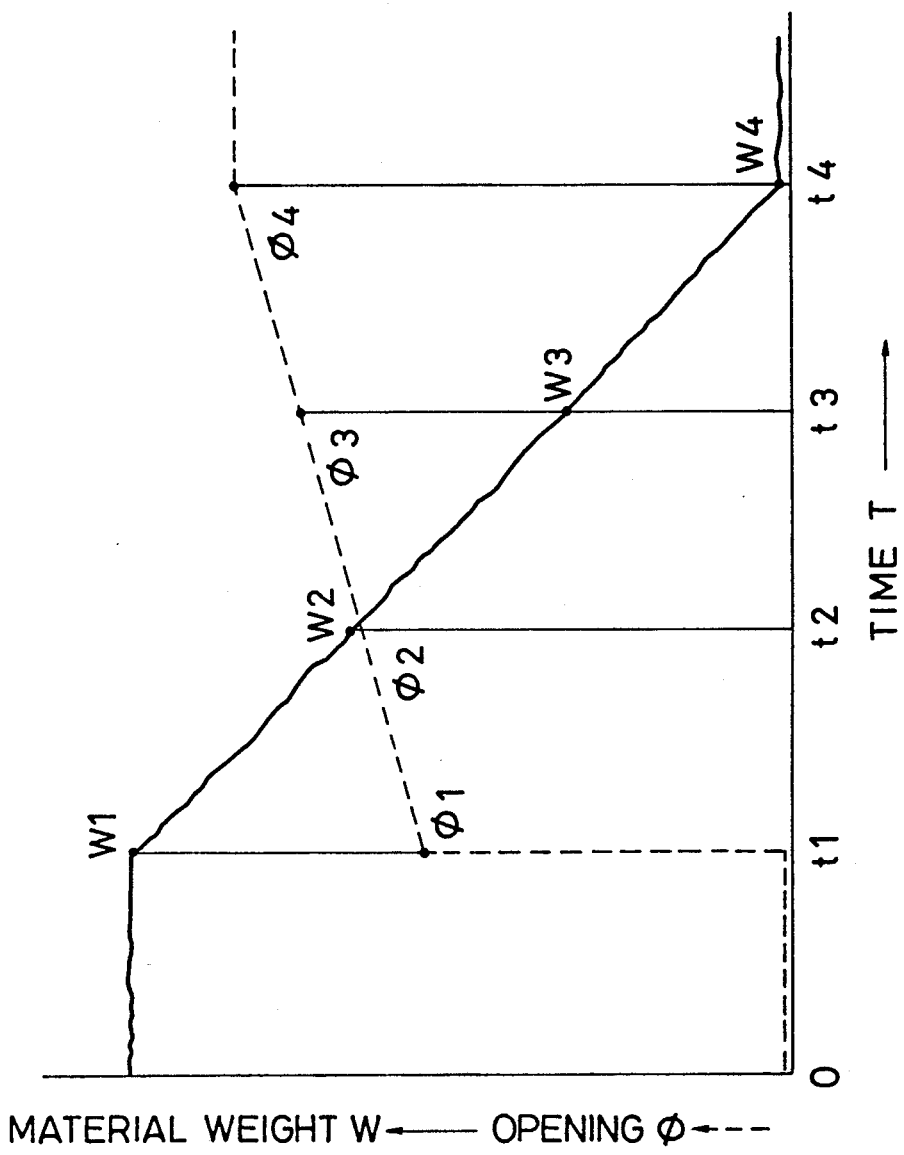
FIG. 9 is a graph of material weight at a furnace top bunker and opening of a flow rate control gate according to elapsed time explaining the determination method of physical properties of material of the present invention.

Although timings for estimation of grain diameter are divided into three parts within one dumping as in FIG. 9 or formulas (10)–(12) in the embodiment, the present invention is not limited to this. That is, such numbers of divisions may be determined according to numbers of rotation in one dumping of the distributing chute, etc. in the case of using the distributing chute 16 at material dumping.

For example, when the distributing chute makes ten rotations in one dumping, three division timings being composed of 1–3 rotations, 4–7 rotations and 7–10 rotations are possible, or three division timings of 1–3 rotations, 4–6 rotations, 7–9 rotations are also possible. Or, more numbers of division may be used, for example, when operation time at the calculating section 144 for grain diameter or corresponding speed to the grain diameter being output from the calculating section 144 for grain diameter allows. Further, one dumping need not be divided equally, and may be divided to conform with applications for the blast furnace operation or improve the control of the flow rate control gate.

Moreover, for example, when the distributing chutes are rotated ten times in one dumping, the ultimate time for the three divisions is made on the tenth rotation. The completion of dumping of all the material being stored in the furnace top bunker does not always occur at the tenth rotation. That is, the dumping completion for whole material often occurs at ninth or eleventh dumping.

For this reason, in the present embodiment, when the completion of dumping, which is detected by the acoustic sensor 125 has occurred earlier than the tenth rotation, the operation according to the equation (12) is corrected. This correction occurs by determining $\phi_4$ or $W_4$ using the equation (12), given that the timing is $t_4$.

As described above, according to the embodiment of the determination method of physical properties of material of the present invention, physical properties of material being dumped can be determined, and control accuracy of the dumping speed of the material can be improved.

Figure 13:
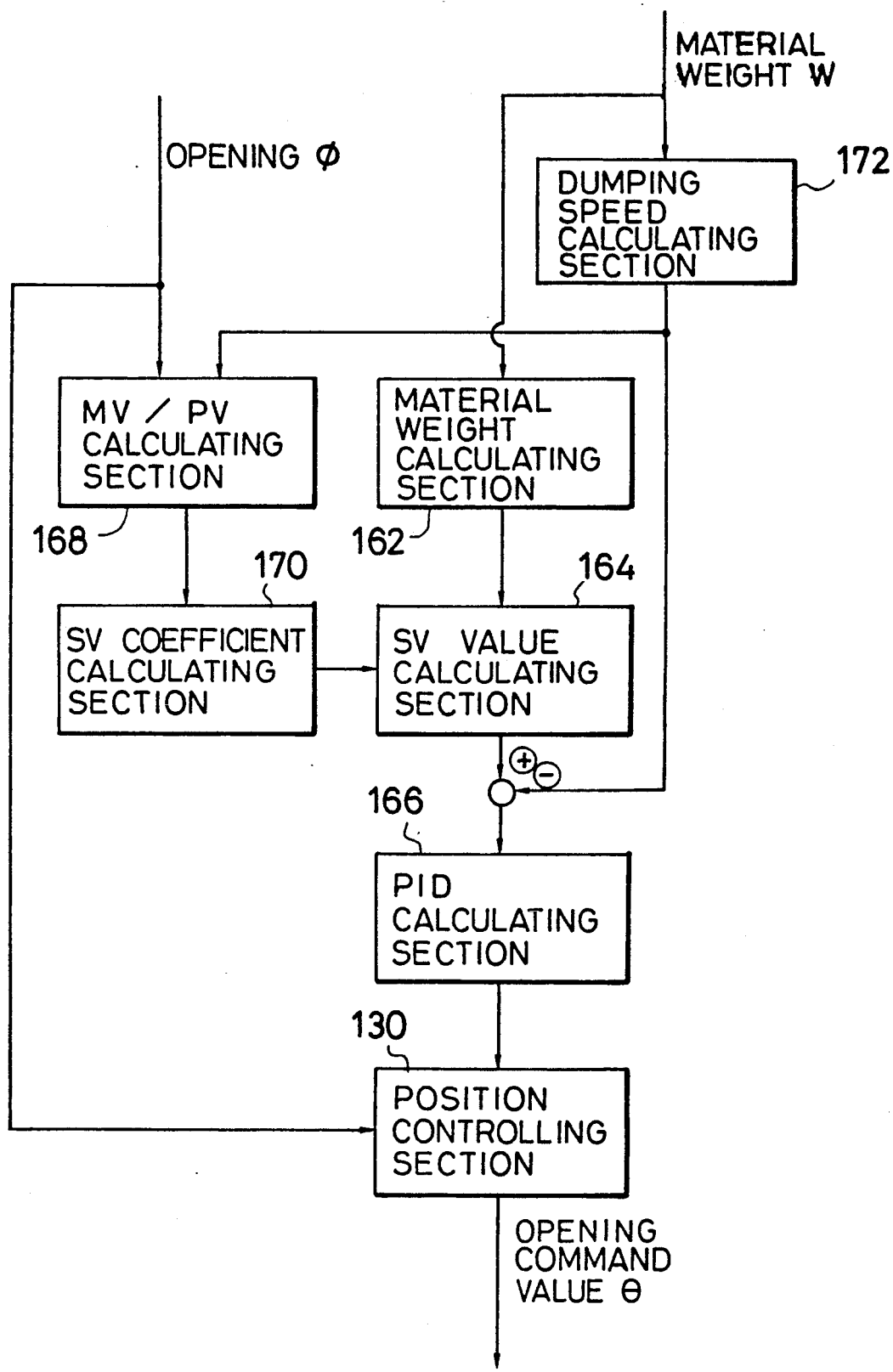
FIG. 13 is a block diagram of another embodiment of control method of material dumping of the present invention.
Figure 14:
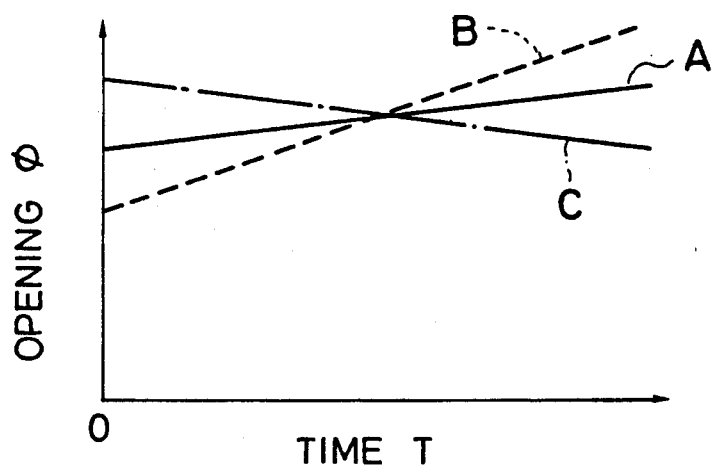
FIG. 14 is a graph of opening of a flow rate control gate according to elapsed time explaining the control method of material dumping of the present invention.

FIG. 13 is a block diagram for another embodiment of control method of material charging according to the present invention.

In the material dumping control device in FIG. 13, the control method of material charging according to the present invention is applied. The control object is the material charging device as shown in FIG. 7.

In FIG. 13, a dumping speed calculating section 172 determines the dumping speed V, based on the decrease per unit time of the material M within the furnace top bunker 10 for the specified time, according to the material weight W being determined by the load cell 22.

Also, a material weight calculating section 162 calculates material weight values according to the material weight W being determined by the load cell 22.

The feedback control for the opening of the flow rate control gate 12 is carried out, so that the actual dumping speed may correspond to the target dumping speed obtained by a given operation, by use of the output of the dumping speed calculating section 172, the output of the material weight calculating section 162, an SV value calculating section 164, a PID calculating section 166 and a position controlling section 130.

Moreover, an MV/PV calculating section 168 calculates MV/PV value which is the ratio of material dumping speed to material grain diameter. That is, the MV/PV calculating section 168 is provided with the calculating section 144 for grain diameter, already explained in FIG. 8. The MV/PV calculating section detects the grain diameter of material being dumped, and carries out an MV/PV operation together with the dumping speed (PV value) input from the dumping speed calculating section 172. For example, when the dumping speed PV value is small, comparing with the opening MV value, the MV/PV value becomes large. Thus, the grain diameter is assumed to be large. The timing for operation at the MV/PV calculating section 168 corresponds to the time $t_2$, $t_3$, $t_4$ etc. indicated in FIG. 9.

An SV coefficient calculating section 170 carries out an operation comparing the MV/PV value being input from the MV/PV calculating section 168 with the MVs/PVs value corresponding to fundamental condition being set in advance as follows.

$$\{(MV/PV)/(MVs/PVs)\} \times \gamma \quad (14)$$

where, the above $\gamma$ is a correction coefficient.

By equation (14), variation of characteristics of grain diameter from the fundamental condition can be detected.

Figure 15:
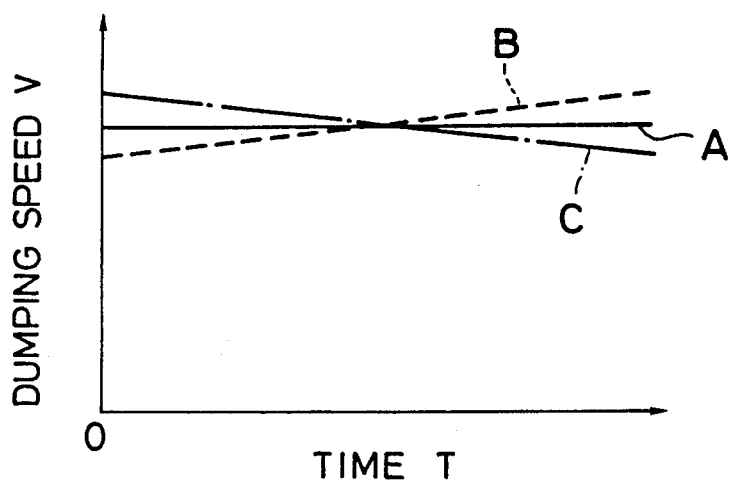
FIG. 15 is a graph of dumping speed according to elapsed time explaining the control method of material dumping of the present invention.
Figure 16:
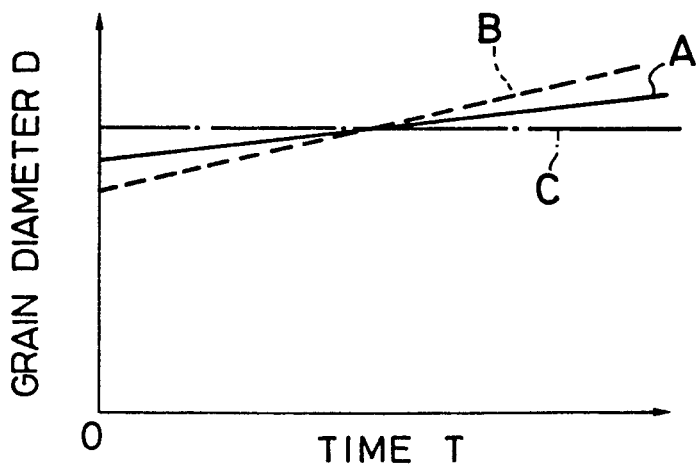
FIG. 16 is a graph of grain diameter of material being dumped according to elapsed time explaining the control method of material dumping of the present invention.

Output of the SV coefficient calculating section 170 is input to the SV value calculating section 164. Thus, a change in the dumping speed V according to the elapsed time T as shown in FIG. 15 occurs immediately and automatically.

As above described, according to the embodiments of the material charging control method of the present invention, the opening of the flow rate control gate can be controlled and the material dumping speed can be controlled so that the ratio of the dumping speed of material being dumped into the blast furnace to the grain diameter of the material may be kept constant. Thereby the distribution of the ratio of the dumping quantity of material being dumped on each part of the upper surface in the blast furnace to the grain diameter can be kept constant, and the gas flow distribution within the blast furnace can be kept constant.

Moreover, in the material charging control method according to the present invention, the physical property determination method for material due to the present invention is used in the MV/PV calculating section 168, but the material charging control method of the present invention is not limited to this. That is, another physical property determination method for material may be used.

Next, an embodiment of control method of distributing chute inclining shift of the present invention will be explained referring to the accompanying drawings.

Figure 17:
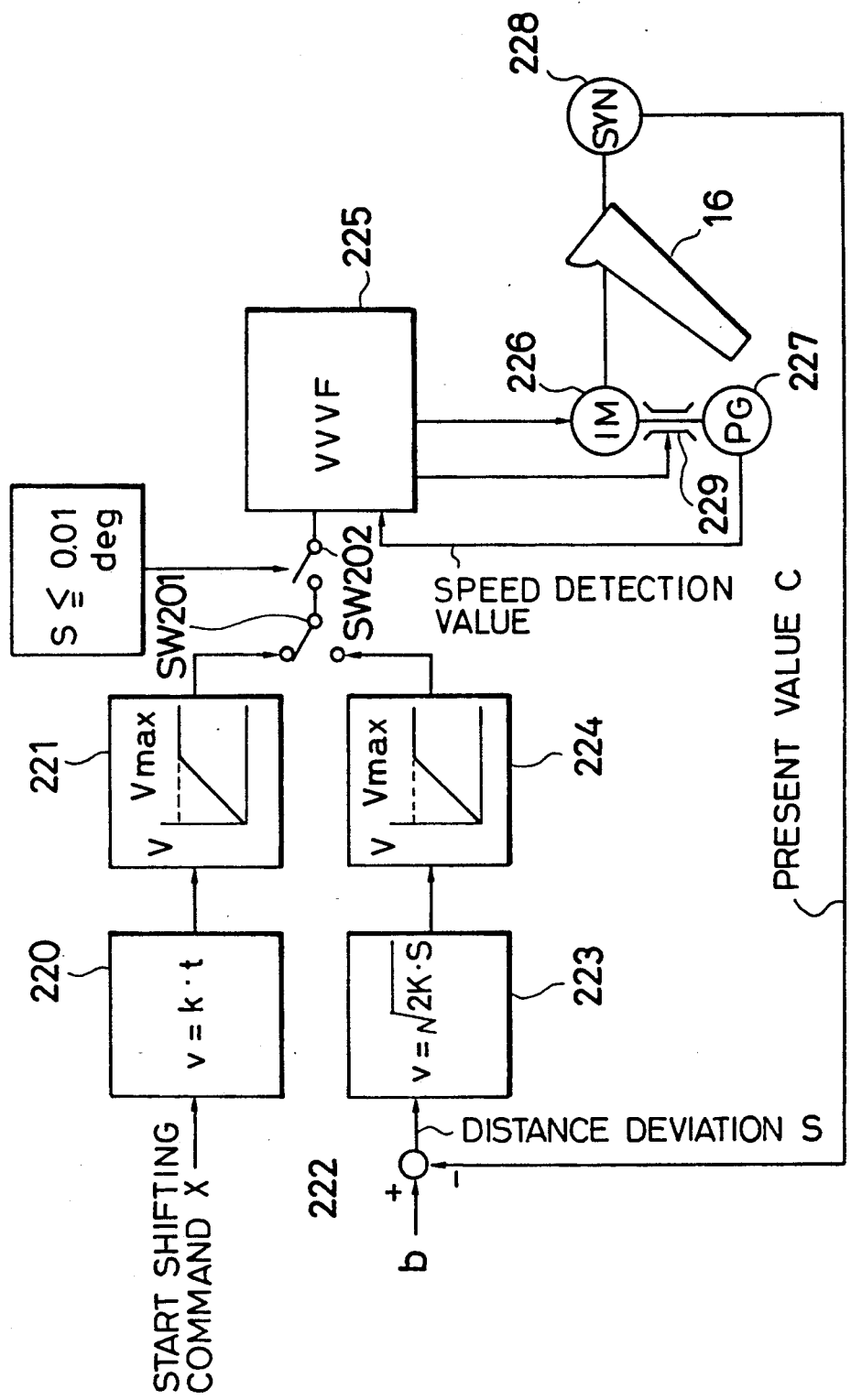
FIG. 17 is a block diagram showing constitution of an embodiment of the control method of inclining shift of a distributing chute of the present invention.

FIG. 17 is a block diagram indicating an embodiment of the present invention, and the embodiment is applied to the bellless furnace top material charging device in FIG. 21 already described.

Figure 18:
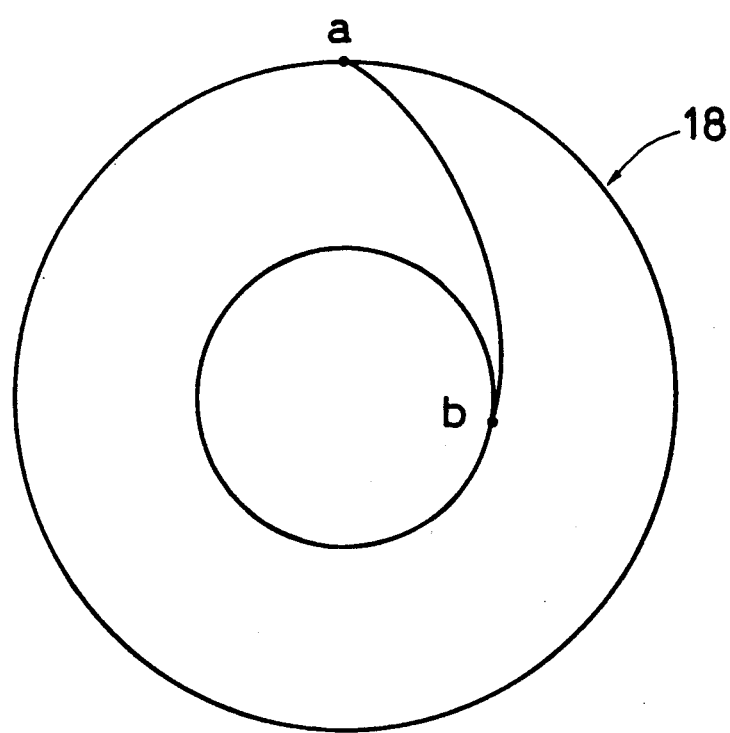
FIG. 18 is a diagram showing dump pattern transfer locus of the distributing chute controlled by the embodiment in FIG. 17.

In the embodiment, for easy understanding, a sample dump pattern 18 shown in FIG. 18. The distributing chute 16 is inclined transferred with inclination from outer circular ring "a" with inclining angle "a" degrees to inner circular ring "b" with inclining angle "b" degrees.

In the figure, numeral 220 designates an inclining speed acceleration time function device for accelerating the inclining speed of the distributing chute 16 at the time of transfer start. The inclining speed acceleration time function device 220 is actuated on receiving the transfer start command X from a controller (not shown), and at the time of actuation, inclining speed value v is outputted, operating following equation $$v = k \cdot t \quad (15)$$

Where k indicates a constant determined by maximum acceleration torque decided by mechanical strength of the distributing chute 16, and t indicates a transfer time for the distributing chute 16.

Accordingly, the inclining speed value v is a primary function of the transfer time t, and increases with a constant rate according to the transfer time t.

Numeral 221 designates a limiter which outputs the inclining speed value v which is increasing at a constant rate and is input by the inclining speed acceleration time function generator 220. The limiter suppressing it up to not more prevents the inclining speed value V from exceeding the highest speed Vmax.

The control inputs the value of the target inclining angle "6" to a comparator 222. Also, input to the comparator is the present actual value "c" degree being detected by an inclining angle detector 228 mounted on an inclining axis of the distributing chute 16. The comparator 222 outputs distance deviation S, that is, remaining distance S up to the target inclining angle "b" degree of the distributing chute 16.

Numeral 223 designates an inclining speed deceleration position function device which decelerates the inclining speed of the distributing chute 16 at the transfer stop time, and operates in parallel to the inclining speed acceleration time function device 220. The inclining speed deceleration position function device 223 uses the distance deviation S input from the comparator 222, and solves the following equation $$v = \sqrt{2K \cdot S} \quad (16)$$

and outputs the inclining speed value v. K is a constant being determined by the mechanical strength of the distributing chute 16 like k, and the constant K is established so that the inclining speed value v may become equal to the highest speed Vmax when the distance deviation is 3 degrees in this embodiment.

Then, equation, $$v = K \cdot t \quad (17)$$

where the rapid deceleration is possible, being integrated on transfer time t, equation $$S = \tfrac{1}{2} K \cdot t^2 \quad (18)$$

is obtained, and the equation (16) is solved using the equations (17) and (18). The inclining speed v is decelerated as a function of the distance deviation S.

Numeral 224 designates a limiter which prevents the inclining speed value v output from the speed deceleration function device 223 from exceeding the highest speed Vmax.

Then, the output of the limiter 221 and the limiter 224 is sent to a variable voltage variable frequency (VVVF) inclining speed control section 225 through a switch SW 201 and a switch SW 202. Switching operation of these switches SW 201 and SW 202 is controlled by the controller.

Concretely, the switch SW 201 is connected to the limiter 221 when the distance deviation S is less than 3 degrees, and connected to the limiter 224 when the distance deviation becomes 3 degrees. Also, the switch 202 is closed when the distance deviation S is less than 0.01 degree, and is opened when the distance deviation S becomes 0.01 degree.

The inclining speed control section 225 uses the inclining speed value v input from limiter 221 or 224 as the speed command value, and based on the speed detection value and speed command value from the inclining speed detector 227, it controls a distribution chute motor (IM) 226 to incline the distributing chute 16, and a mechanical brake 229 to brake the distributing chute motor 226.

The inclining speed control section 225 operates the distributing chute motor 226 based on the speed command value from the limiter 221 or the limiter 224, and feeds back the speed detection value from the inclining speed detector 227 and controls the rotational speed of the distributing chute motor 226.

The inclining speed control section 225 operates the mechanical brake 229 when the speed detection value from the inclining speed detector 227 amounts to 2% of the highest speed Vmax.

Next, operation of the embodiment will be explained.

At the time of transfer start of the distributing chute 16, the transfer start command X is input from the controller (not shown) to the inclining speed acceleration time function device 220. The inclining speed value v increasing at a constant rate as indicated in equation (15) is output from the inclining speed acceleration time function device 220. The inclining speed value v is inputted as the speed command value through the limiter 221, and the switches SW 201, SW 202 to the inclining speed control section 225.

Figure 19:
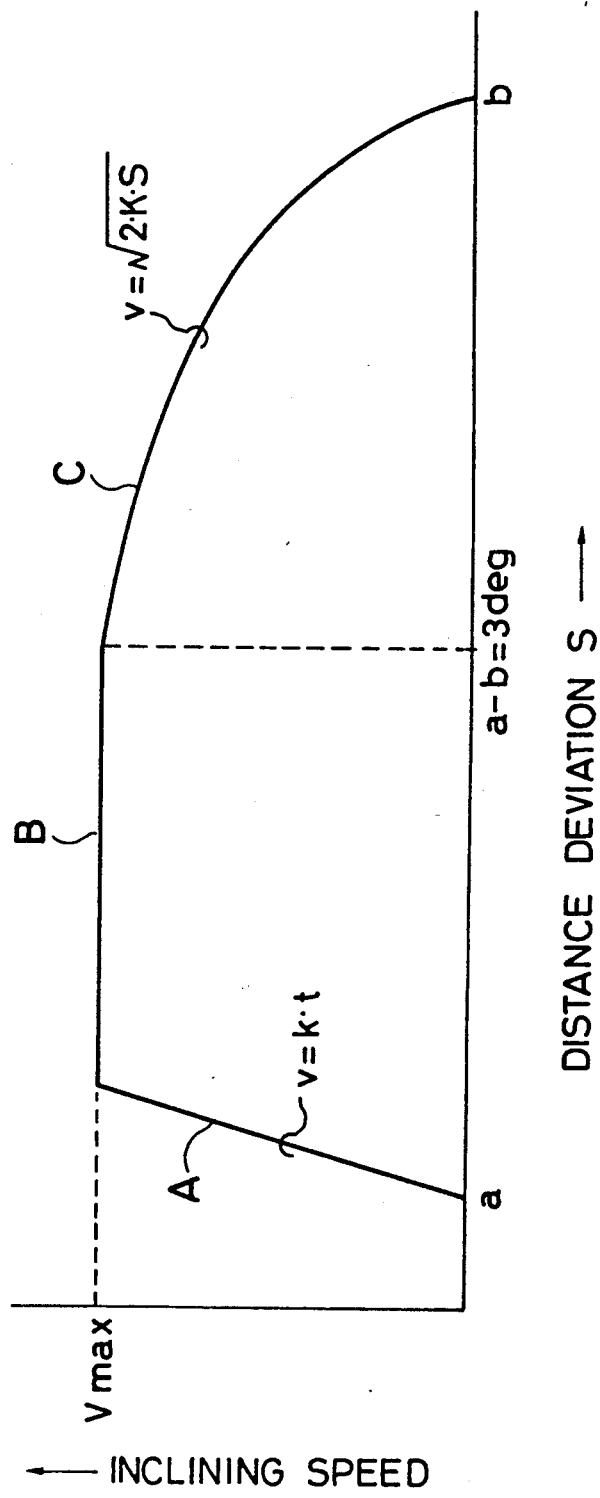
FIG. 19 is a diagram showing relation between inclining speed and distance deviation of the distributing chute of the embodiment.

At this time, since the speed command value input to the inclining speed control section 225 controls the inclining speed value v increasing with a constant rate indicated in the equation (15), the inclining speed control section 225 increases the inclining speed of the distributing chute 16 at a constant rate as shown in the straight line A in FIG. 19 using the distributing chute motor 226.

Accordingly, as the distributing chute 16 is accelerated smoothly from the initial position at the outer circular ring "a" of the dump pattern 18, vibration is not produced on the distributing chute 16 or on material M on the distributing chute 16 at the time of transfer start.

When the inclining speed value v from the inclining speed acceleration time function device 220 reaches the highest speed Vmax, the inclining speed value v is limited by the limiter 221 and maintained at the maximum speed Vmax, and the distributing chute 16 is inclined at uniform speed equal to the maximum speed Vmax.

When the top of the distributing chute 16 approaches the inner circular ring b and its inclination angle becomes 3 degrees, the switch SW 201 is connected to the limiter 224 by the controller, and the inclination speed value v indicated in equation (16) is output from the inclining speed deceleration position function device 223 operating in parallel to the inclining speed acceleration time function device 220 through the limiter 224 to the inclining speed control section 225.

The inclining speed control section 225 inputting the inclination speed value v as the speed command value decelerates the inclination speed value v of the distributing chute 16 as a function of the distance deviation S, as indicated by the curve C in FIG. 19, and transfers to the transfer stop control of the distributing chute 16.

At this time, since the inclining speed value v indicated in equation (16) is set to become the highest speed Vmax when the distance deviation S is at 3 degrees as above described, the inclining speed value v of the distributing chute 16 is decelerated continuously from the condition of the maximum speed Vmax, as shown by the horizontal line B and the curve C in FIG. 19. Accordingly, as the distributing chute 16 is decelerated smoothly at the time of transfer stop, vibration is not produced on the distributing chute 16 or on the material M on the distributing chute 16.

When the distributing chute 16 further approaches the inner circular ring "b" and the distance deviation S becomes 0.01 degree, the switch SW 202 is opened and regenerative braking is applied to the distributing chute motor 226. The inclining speed value v of the distributing chute 16 is significantly decelerated as shown by the straight line D in FIG. 20.

When the inclining speed value v becomes 2% of the highest speed Vmax in this deceleration state, the inclination speed control section 225 actuates the mechanical brake 229 and the distributing chute 16 is stopped. As the distributing chute 16 is braked at the time when the inclining speed value v becomes extremely low, i.e., equal to 2% of the maximum speed Vmax, the top end of the distributing chute 16 is stopped exactly on the inner circular ring "b" of the dump pattern 18. Therefore, the position accuracy is extremely high, and is plus or minus 0.01 degree in the embodiment.

Figure 20:
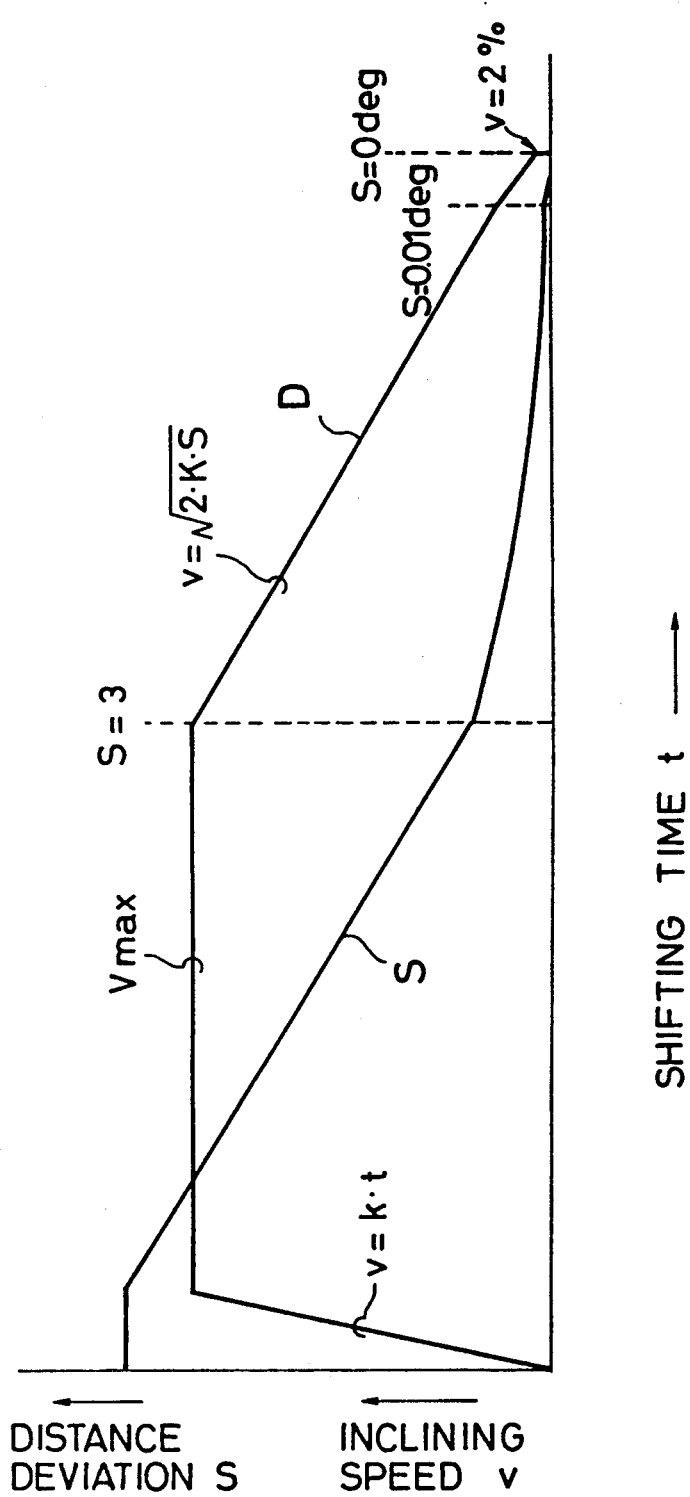
FIG. 20 is a diagram showing relation between inclining speed, shifting time and distance deviation.
Figure 24:
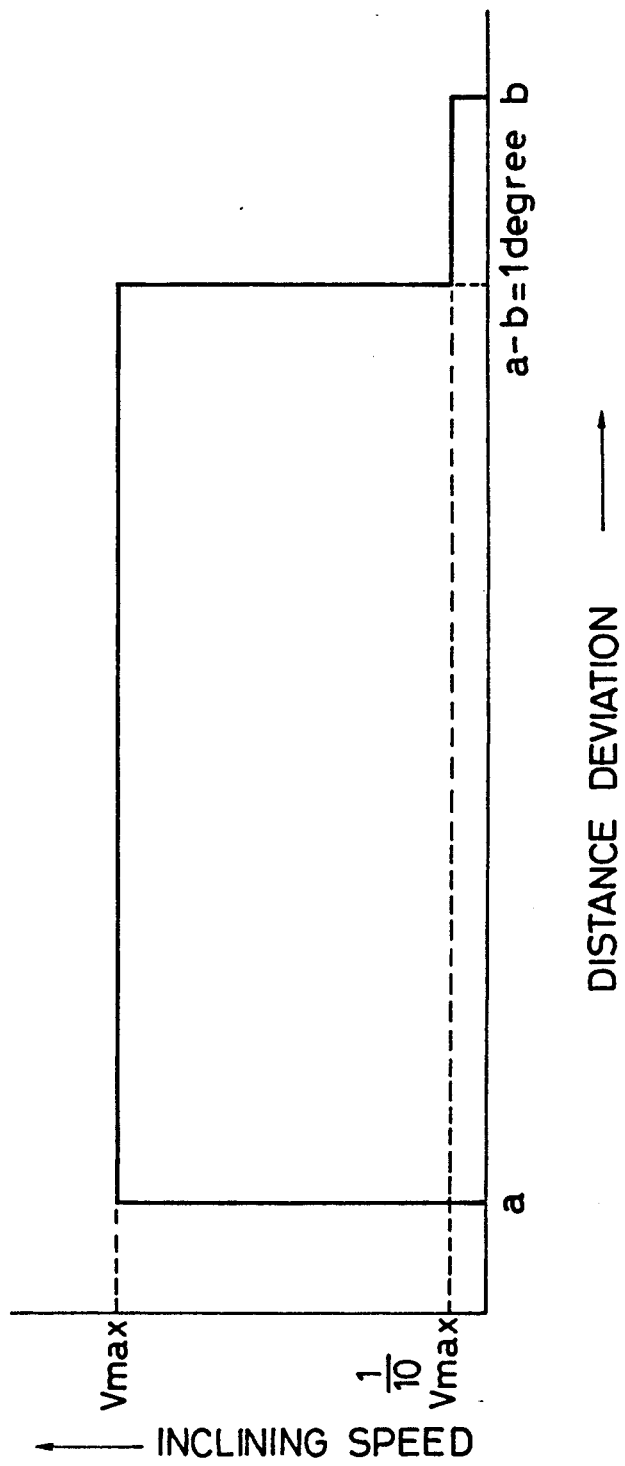
FIG. 24 is a diagram showing relation between inclining speed and distance deviation of a distributing chute in the control method of FIG. 23.

The inclining speed value v of the distributing chute 16 after transfer to the transfer stop operation is decelerated as shown in equation (17) and the straight line D in FIG. 20, and the mean speed up to the stop time is significantly high in comparison with that in the prior art indicated in FIG. 24. Accordingly, time required from the transfer stop operation start (S=3 degree) to the stop (S=b degree) is short, and approximately three seconds in the embodiment. As a result, the transfer locus between circular rings "a" and "b" of the dump pattern 18 becomes extremely short (refer to FIG. 18), and undesired dumping of material M between the circular rings "a" and "b" does not occur.

What is claimed is:

1. A control method for material charging into a top of a blast furnace, wherein material being stored in a furnace top bunker is dumped at a flow rate through a flow rate control gate into a blast furnace in a specified time period, said control method comprising the steps of:
   measuring an initial material weight by weighing the material in the furnace top bunker prior to a dumping operation;
   calculating a first target dumping speed by dividing the value of the initial material weight by the specified time period;
   measuring a current material weight during the dumping operation by reweighing the material in the furnace top bunker; and
   controlling during the dumping operation an amount of opening of said flow rate control gate based on the current material weight to maintain a first actual material dumping speed at the first target dumping speed.

2. The control method for material charging of claim 1, further comprising the steps of:
   measuring a remaining material weight by reweighing the material remaining in said furnace top bunker at a midpoint of the dumping operation;
   calculating a second target dumping speed by dividing the value of the remaining material weight by a remaining time;
   measuring a current material weight during the dumping operation by reweighing the material in the furnace top bunker; and
   controlling an amount of opening of said flow rate control gate based on the current material weight so that a second actual dumping speed of the remaining material weight is maintained at the second target dumping speed.

3. The control method for material charging of claim 2, wherein the second target dumping speed is set to a value not less than the first target dumping speed.

4. The control method for material charging if claim 2, wherein the amount of opening of said flow rate control gate is controlled based on at least one physical property of the material.

5. The control method for material charging of claim 4, further comprising the steps of:
   detecting an amount of opening of the flow rate control gate;
   detecting a dumping speed of material being dumped through said flow rate control gate into the blast furnace; and
   determining the at least one physical property of the material based on the detected amount of opening of the flow rate control gate and the detected material dumping speed.

6. The control method for material charging of claim 2, further comprising the step of:
   controlling the amount of opening of said flow control gate based on a ratio of a material dumping quantity and material grain diameter, thereby controlling a distribution of gas flow within the furnace to maintain a constant gas flow.

7. The control method for material charging of claim 6, wherein the amount of opening of said flow rate control gate is controlled to maintain the ratio of material dumping speed to material grain diameter at a constant value.

8. The control method of material dumping of claim 6, wherein a process variable PV is set to a value of one of the first and second actual material dumping speeds and a reciprocal of process variable PV 1PV, is used as an index of the at least one physical property of the material.

9. The control method for material dumping of claim 6, wherein a manipulation variable is set to a value of the amount of the opening of the flow rate control gate, and a ratio of the manipulation variable, MV to the process variable PV, MV/PV, is used as an index of the at least one physical property of the material.

10. The control method of claim 1, wherein the material weight measured during the dumping operation is continuously measured and the amount of opening of the flow rate control gate is controlled based on the continuous measurements of the current material weight to provide real time control of the current material dumping speed.

11. The control method for material charging of claim 1, wherein dumping of the material is carried out using a distributing chute capable of being inclined to form a dump pattern of concentric circular ring form.

12. The control method for material charging of claim 11, further comprising the step of transferring said distributing chute from an outside circular ring of the dump pattern to an inside circular ring of the dump pattern by a distributing chute inclining operation, wherein at a time of material transfer start, an inclining speed of the distributing chute is accelerated continuously based on a material transfer time period and at a time of material transfer stop, the inclining speed of the distributing chute is decelerated continuously based on a transfer position of the distributing chute.

13. A control device for material charging into a top of a blast furnace, wherein material being stored in a furnace top bunker is dumped at a flow rate through a flow rate control gate into a blast furnace in a specified time period, said control device comprising:
   means for measuring an initial material weight in the furnace top bunker prior to the start of a dumping operation;
   means for calculating a dumping time;
   means for detecting an actual dumping speed after the dumping start;
   means for measuring a current material weight during dumping by weighing the material in the top bunker; and
   means for calculating a first target dumping speed by dividing a value of the initial material weight by the specified time period, and for controlling an amount of opening of the flow rate control gate during the dumping operation based on the current material weight to maintain a first actual dumping speed at the first target dumping speed.

14. The control device of claim 13, further comprising:

means for measuring a remaining material weight by weighing the material remaining in the furnace top bunker at a midpoint of the dumping operation;

means for calculating a second target speed by dividing a value of the remaining material weight by a remaining dumping time; and means for controlling the amount of opening of the flow rate control gate during the dumping operation based on the current material weight measured during the dumping operation to maintain a second actual dumping speed of the remaining material weight at the second target dumping speed.

15. The control device of claim 14, wherein the means for measuring a material weight during the dumping operation continuously weighs the material in the furnace top bunker during dumping operation and the means for controlling controls the amount of opening of the feed rate control gate based on the continuously measured current material weight to provide real time control of the material dumping speed.

* * * * *